US010353902B2

United States Patent
Obinata et al.

(10) Patent No.: US 10,353,902 B2
(45) Date of Patent: Jul. 16, 2019

(54) NON-TRANSITORY COMPUTER-READABLE RECORDING MEDIUM, RETRIEVAL SUPPORT DEVICE, AND RETRIEVAL SUPPORT METHOD

(71) Applicant: FUJITSU LIMITED, Kawasaki-shi, Kanagawa (JP)

(72) Inventors: Shunichi Obinata, Kawasaki (JP); Tamotsu Sengoku, Kasugai (JP)

(73) Assignee: FUJITSU LIMITED, Kawasaki (JP)

( * ) Notice: Subject to any disclaimer, the term of this patent is extended or adjusted under 35 U.S.C. 154(b) by 484 days.

(21) Appl. No.: 15/170,146

(22) Filed: Jun. 1, 2016

(65) Prior Publication Data

US 2016/0357825 A1   Dec. 8, 2016

(30) Foreign Application Priority Data

Jun. 4, 2015 (JP) .................................. 2015-113823

(51) Int. Cl.
*G06F 16/00* (2019.01)
*G06F 16/2457* (2019.01)
(Continued)

(52) U.S. Cl.
CPC ...... *G06F 16/24575* (2019.01); *G06F 16/248* (2019.01); *G06F 16/383* (2019.01)

(58) Field of Classification Search
CPC ......... G06F 17/30528; G06F 17/30554; G06F 16/38; G06F 16/381; G06F 16/382; G06F 16/383; G06F 16/387
See application file for complete search history.

(56) References Cited

U.S. PATENT DOCUMENTS

2006/0248074 A1* 11/2006 Carmel ............. G06F 17/30613
2007/0239693 A1* 10/2007 Hellmuth .......... G06F 17/30864
(Continued)

FOREIGN PATENT DOCUMENTS

| JP | 2008-84055 | 4/2008 |
| JP | 2009-211639 | 9/2009 |
| WO | 2014/002512 A1 | 1/2014 |

OTHER PUBLICATIONS

Pan et al., "Cross Domain Sentiment Classification via Spectral Feature Alignment", Proceedings of the 19th International Conference on World Wide Web, ACM, pp. 751-760, Apr. 26, 2010.
(Continued)

*Primary Examiner* — Alexander Khong
(74) *Attorney, Agent, or Firm* — Staas & Halsey LLP

(57) ABSTRACT

A retrieval support method including acquiring, for each of a plurality of categories relating to computer systems, frequency information including a frequency of occurrence of each of a plurality of terms included in pieces of text information on the computer systems, specifying, a plurality of first terms and a plurality of second terms, the plurality of first terms being terms which is not used in common to the plurality of categories, the plurality of second terms being a terms which is used in common, generating correspondence information, for each of the plurality of first terms, that associates selected first term with at least one of the plurality of second terms which is included in a piece of text information including the selected first term, and generating specified information to identify each combination of first terms, belonging to different category among the plurality of categories, that have correlativity.

15 Claims, 22 Drawing Sheets

(51) Int. Cl.
  *G06F 16/248* (2019.01)
  *G06F 16/383* (2019.01)

(56) References Cited

U.S. PATENT DOCUMENTS

| | | | | |
|---|---|---|---|---|
| 2009/0307209 A1* | 12/2009 | Carmel | ............... | G06F 17/3069 |
| 2009/0313236 A1* | 12/2009 | Hernacki | .......... | G06F 17/30796 |
| 2012/0084281 A1* | 4/2012 | Colosi | ............... | H04L 29/12632 707/723 |
| 2015/0032727 A1 | 1/2015 | Chung | | |
| 2016/0103836 A1* | 4/2016 | Lee | .................... | G06F 17/3053 707/706 |
| 2016/0103837 A1* | 4/2016 | Lee | .................... | G06F 17/3053 707/730 |
| 2016/0103885 A1* | 4/2016 | Lee | .................. | G06F 17/30539 707/739 |
| 2016/0103920 A1* | 4/2016 | Lee | .................. | G06F 17/30867 707/706 |

OTHER PUBLICATIONS

Japanese Office Action dated Mar. 19, 2019 for Japanese Patent Application No. 2015-113823, 7 pages.

\* cited by examiner

FIG. 12

| ID | TERM | FREQUENCY OF OCCURRENCE (%) |
|---|---|---|
| 1 | SERVER | 95 |
| 2 | root | 98 |
| 3 | administrator | 0.2 |
| 4 | LOGIN | 98 |
| 5 | start.sh | 70 |
| 6 | delete.bat | 2 |
| 7 | EXECUTION | 98 |
| 8 | MANAGER | 15 |
| 9 | administrator | 0.1 |
| 10 | roat | 0.8 |
| 11 | start.bat | 1.2 |
| 12 | delete.sh | 66 |
| 13 | INTERRUPTION | 12 |
| 14 | RECOVERY | 18 |
| 15 | CONTACT | 32 |
| 16 | LOGOUT | 80 |
| 17 | STARTUP | 72 |
| 18 | STOP | 77 |
| 19 | SERVICE a2 | 23 |

FIG. 13

| ID | TERM | FREQUENCY OF OCCURRENCE (%) |
|---|---|---|
| 1 | SERVER | 90 |
| 2 | root | 0.4 |
| 3 | administrator | 90 |
| 4 | LOGIN | 95 |
| 5 | start.sh | 0.1 |
| 6 | delete.bat | 40 |
| 7 | EXECUTION | 99 |
| 8 | MANAGER | 21 |
| 9 | administrator | 0.9 |
| 10 | roat | 0.1 |
| 11 | start.bat | 72 |
| 12 | delete.sh | 2.2 |
| 13 | INTERRUPTION | 20 |
| 14 | RECOVERY | 12 |
| 15 | CONTACT | 39 |
| 16 | LOGOUT | 83 |
| 17 | STARTUP | 75 |
| 18 | STOP | 73 |
| 19 | SERVICE a2 | 19 |

FIG. 14

| ID | TERM | FREQUENCY OF OCCURRENCE (BBB(V.2)) | FREQUENCY OF OCCURRENCE (AAA(V.6)) | SUBTRACTION VALUE | SPECIFICATION RESULT |
|---|---|---|---|---|---|
| 1 | SERVER | 95 | 90 | 5 | SECOND TERM |
| 2 | root | 98 | 0.4 | 97.6 | FIRST TERM |
| 3 | administrator | 0.2 | 90 | 89.8 | FIRST TERM |
| 4 | LOGIN | 98 | 95 | 3 | SECOND TERM |
| 5 | start.sh | 70 | 0.1 | 69.9 | FIRST TERM |
| 6 | delete.bat | 2 | 40 | 38 | FIRST TERM |
| 7 | EXECUTION | 98 | 99 | 1 | SECOND TERM |
| 8 | MANAGER | 15 | 21 | 6 | SECOND TERM |
| 9 | administrator | 0.1 | 0.9 | 0.8 | MISSPELLING |
| 10 | roat | 0.8 | 0.1 | 0.7 | MISSPELLING |
| 11 | start.bat | 1.2 | 72 | 70.8 | FIRST TERM |
| 12 | delete.sh | 66 | 2.2 | 63.8 | FIRST TERM |
| 13 | INTERRUPTION | 12 | 20 | 8 | SECOND TERM |
| 14 | RECOVERY | 18 | 12 | 6 | SECOND TERM |
| 15 | CONTACT | 32 | 39 | 7 | SECOND TERM |
| 16 | LOGOUT | 80 | 83 | 3 | SECOND TERM |
| 17 | STARTUP | 72 | 75 | 3 | SECOND TERM |
| 18 | STOP | 77 | 73 | 4 | SECOND TERM |
| 19 | SERVICE a2 | 23 | 19 | 4 | SECOND TERM |

FIG. 15

| ID | FIRST TERM | SECOND TERM |
|---|---|---|
| 1 | root | SERVER |
| | | LOGIN |

FIG. 16

| ID | FIRST TERM | SECOND TERM |
|---|---|---|
| 1 | root | SERVER |
| | | LOGIN |
| 2 | delete.sh | EXECUTION |

FIG. 17

| ID | FIRST TERM | SECOND TERM |
|---|---|---|
| 1 | root | SERVER |
| | | LOGIN |
| | | MANAGER |
| | | CONTACT |
| 2 | delete.sh | EXECUTION |

FIG. 18

| ID | FIRST TERM | SECOND TERM |
|---|---|---|
| 1 | root | SERVER |
| | | LOGIN |
| | | MANAGER |
| | | CONTACT |
| 2 | delete.sh | EXECUTION |
| 3 | administrator | SERVER |
| | | LOGIN |
| 4 | delete.bat | EXECUTION |
| | | INTERRUPTION |

FIG. 19

| ID | FIRST TERM | SECOND TERM |
|---|---|---|
| 1 | administrator | SERVER |
| | | LOGIN |
| | | MANAGER |
| | | USER |
| | | DOMAIN |
| 2 | delete.bat | SERVER |
| | | EXECUTION |
| | | RECOVERY |
| 3 | delete.sh | INTERRUPTION |
| 4 | root | LOGIN |

FIG. 20

| ID | FIRST TERM (BBB(V.2)) | FIRST TERM (AAA(V.6)) |
|---|---|---|
| 1 | root | administrator |

NON-TRANSITORY COMPUTER-READABLE RECORDING MEDIUM, RETRIEVAL SUPPORT DEVICE, AND RETRIEVAL SUPPORT METHOD

CROSS-REFERENCE TO RELATED APPLICATION

This application is based upon and claims the benefit of priority of the prior Japanese Patent Application No. 2015-113823, filed on Jun. 4, 2015, the entire contents of which are incorporated herein by reference.

FIELD

The embodiment discussed herein is related to a non-transitory computer-readable storage medium, a retrieval support device, and a retrieval support method.

BACKGROUND

An operator who operates and manages a business system (hereinafter, simply referred to as an operator) stores information (hereinafter, also referred to as incident information) regarding a failure and the like (hereinafter, also referred to as an incident event) which is generated in, for example, middleware operated as a portion of the business system or an application. Specifically, in a case where the operator receives an inquiry from a user of the business system (hereinafter, simply referred to as a user), the operator stores incident information in which a new incident event, which is contents of the received inquiry, and a method of solving the incident event are associated with each other.

In a case where a new incident event is generated, the operator retrieves incident information regarding the same incident event as the newly generated incident event, from the stored incident information (incident information generated in the past). Thereby, in a case where incident information regarding the same incident event as the newly generated incident event is stored, the operator can acquire a method of solving the newly generated incident event (see, for example, Japanese Laid-open Patent Publication No. 2009-211639 and Japanese Laid-open Patent Publication No. 2008-084055).

SUMMARY

According to an aspect of the invention, a non-transitory computer-readable recording medium storing a retrieval support program that causes a computer to execute a process including acquiring, for each of a plurality of categories relating to computer systems, frequency information including a frequency of occurrence of each of a plurality of terms included in pieces of text information on the computer systems, each of the pieces of text information belonging to one of the plurality of categories, specifying, among each of the plurality of terms, a plurality of first terms and a plurality of second terms included in at least one of the pieces of text information based on the frequency information, the plurality of first terms being terms which is not used in common to the plurality of categories, the plurality of second terms being a terms which is used in common to the plurality of categories, generating correspondence information for each of the plurality of first terms, the correspondence information associating, for each selected first term of the plurality of first terms, the selected first term with at least one of the plurality of second terms which is included in a piece of text information including the selected first term, and generating specified information to identify each combination of first terms, belonging to different category among the plurality of categories, that have correlativity in at least one of the associated plurality of second terms based on the generated correspondence information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating a specific example of frequency information;

FIG. 13 is a diagram illustrating a specific example of frequency information;

FIG. 14 is a diagram illustrating a specific example of term specification information;

FIG. 15 is a diagram illustrating a specific example of correspondence information;

FIG. 16 is a diagram illustrating a specific example of correspondence information;

FIG. 17 is a diagram illustrating a specific example of correspondence information;

FIG. 18 is a diagram illustrating a specific example of correspondence information;

FIG. 19 is a diagram illustrating a specific example of correspondence information;

FIG. 20 is a diagram illustrating a specific example of identical term information;

DESCRIPTION OF EMBODIMENT

The above-mentioned business system is generally constituted by a plurality of components such as an operating system (OS), middleware and an application. For example, the same type of pieces of middleware may operate on different OSs, depending on configurations of business systems. Furthermore, in this case, contents included in incident information may be different from each other depending on OSs having middleware operating thereon, in spite of pieces of incident information regarding incident events having the same contents. Specifically, for example, contents of a file path and a name of a command which are included in incident information may vary between different OSs having middleware operating thereon.

For this reason, even when incident information corresponding to an incident event having the same contents as those of a newly generated incident event is stored, an operator may not be able to retrieve appropriate incident information depending on a retrieval key or the like which is used during retrieval.

In one aspect, an object of the embodiment is to provide a retrieval support program, a retrieval support device, and a retrieval support method for supporting the retrieval of stored incident information.

Hereinafter, an embodiment will be described with reference to the accompanying drawings. However, the technical scope of the embodiment is not limited thereto, and covers matters described in claims and the equivalent thereof.

Configuration of Information Processing System

Figure 1:
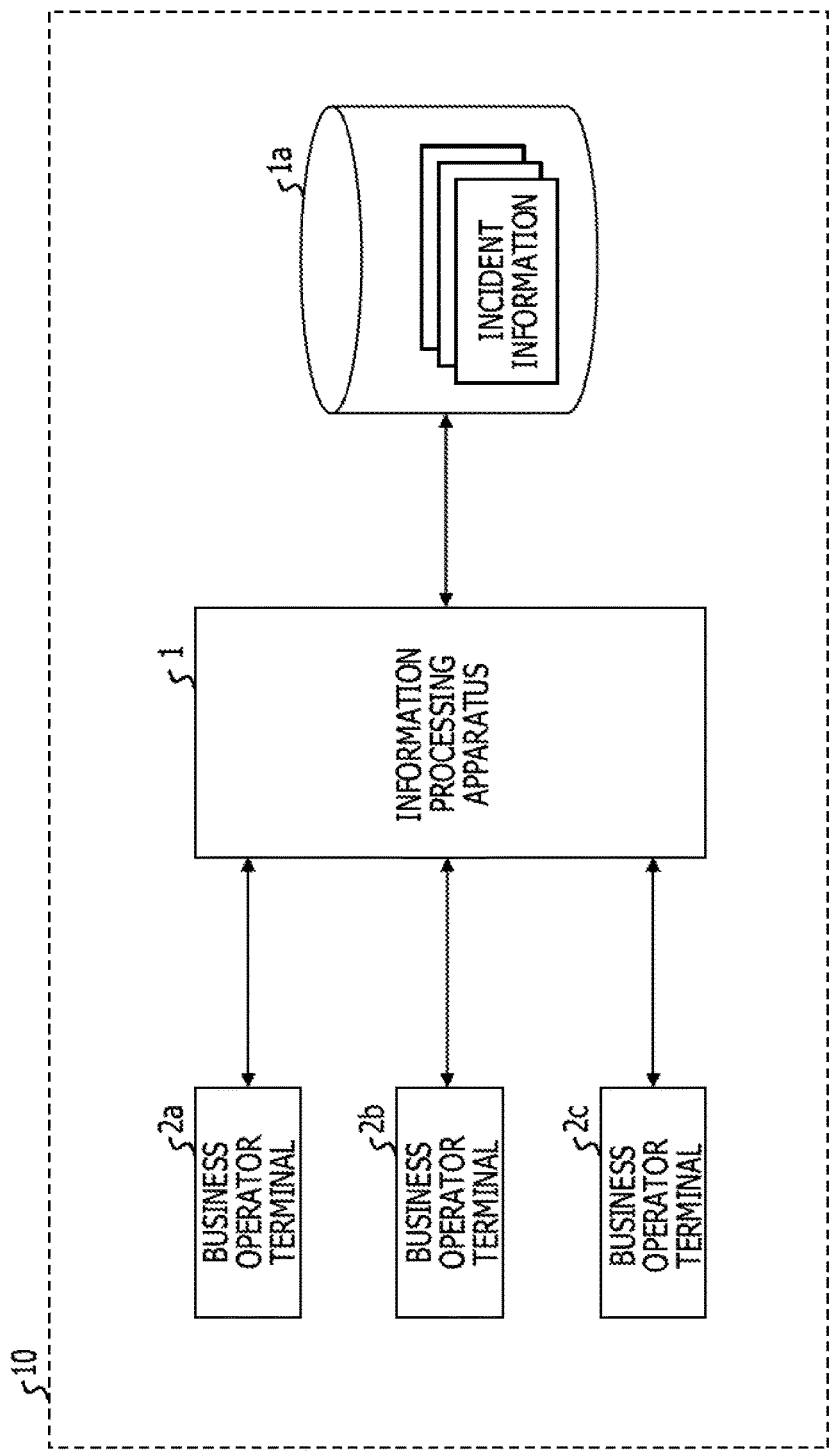
FIG. 1 is a diagram illustrating the overall configuration of an information processing system.

FIG. 1 is a diagram illustrating the overall configuration of an information processing system 10. The information processing system 10 illustrated in FIG. 1 includes an information processing apparatus 1 (hereinafter, also referred to as a computer 1), and business operator terminals 2a, 2b, and 2c (hereinafter, collectively referred to as a business operator terminal 2).

For example, the information processing apparatus 1 stores, in a storage unit 1a, incident information regarding an incident event generated in middleware or an application which operates in a business system used by a user (hereinafter, simply referred to as a business system).

In a case where a new incident event is generated, the business operator terminal 2 requests the information processing apparatus 1 to retrieve incident information. Specifically, in a case where there is an inquiry (inquiry through a telephone or an e-mail) from a user, an operator inputs contents of the received inquiry (incident event) in accordance with an input form displayed on an input-output device (not shown) of the business operator terminal 2. In a case where an incident event is input in the input-output device, the business operator terminal 2 requests the information processing apparatus 1 to retrieve incident information.

On the other hand, in a case where the information processing apparatus 1 receives the request for the execution of retrieval from the business operator terminal 2, the information processing apparatus retrieves incident information corresponding to the same incident event as the incident event which is input, from the incident information stored in the storage unit 1a. Thereby, the information processing apparatus 1 can acquire a method of solving a newly generated incident event from a solution method included in an incident event generated in the past, and can present the acquired solution method to an operator. That is, in a case where the storage unit is includes incident information corresponding to the same incident event as the incident event which is input, the operator can rapidly present a method of solving a newly generated incident event to the user.

In addition, in a case where a new incident event is generated, the business operator terminal 2 creates, for example, new incident information in which contents of the generated incident event and a method of solving an incident event generated are associated with each other. Specifically, for example, the business operator terminal 2 creates incident information according to contents of an incident event which is input by an operator and contents of a reply given to a user by the operator. The business operator terminal 2 transmits the created incident information to the information processing apparatus 1. Thereby, the information processing apparatus 1 can continuously store incident information in accordance with the generation of a new incident event.

Meanwhile, the information processing system 10 includes three business operator terminals 2 (business operator terminals 2a, 2b, and 2c) in the example illustrated in FIG. 1, but may be configured to include two or less or four or more business operator terminals 2. In addition, incident information may be created by the information processing apparatus 1 based on, for example, contents of an incident event which is input by an operator and contents of a reply given to a user by the operator.

Specific Example of Incident Information

Figure 2:
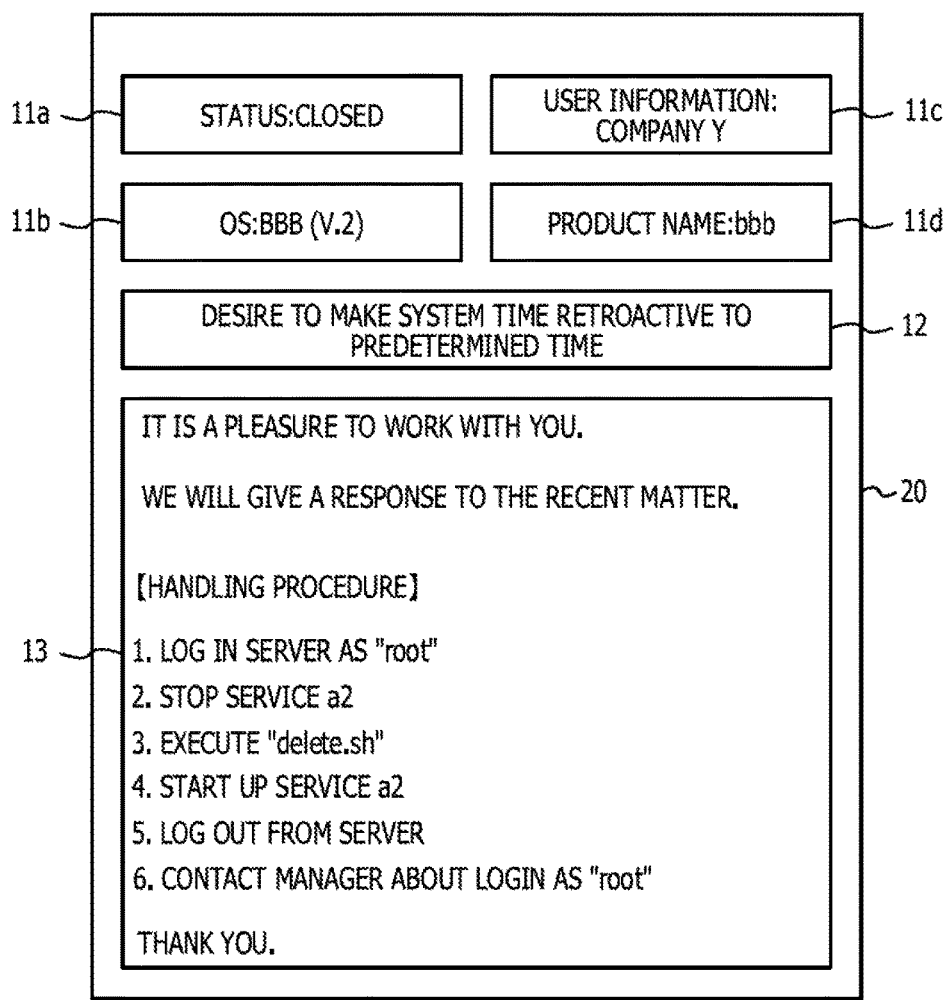
FIG. 2 is a diagram illustrating a specific example of incident information.
Figure 3:
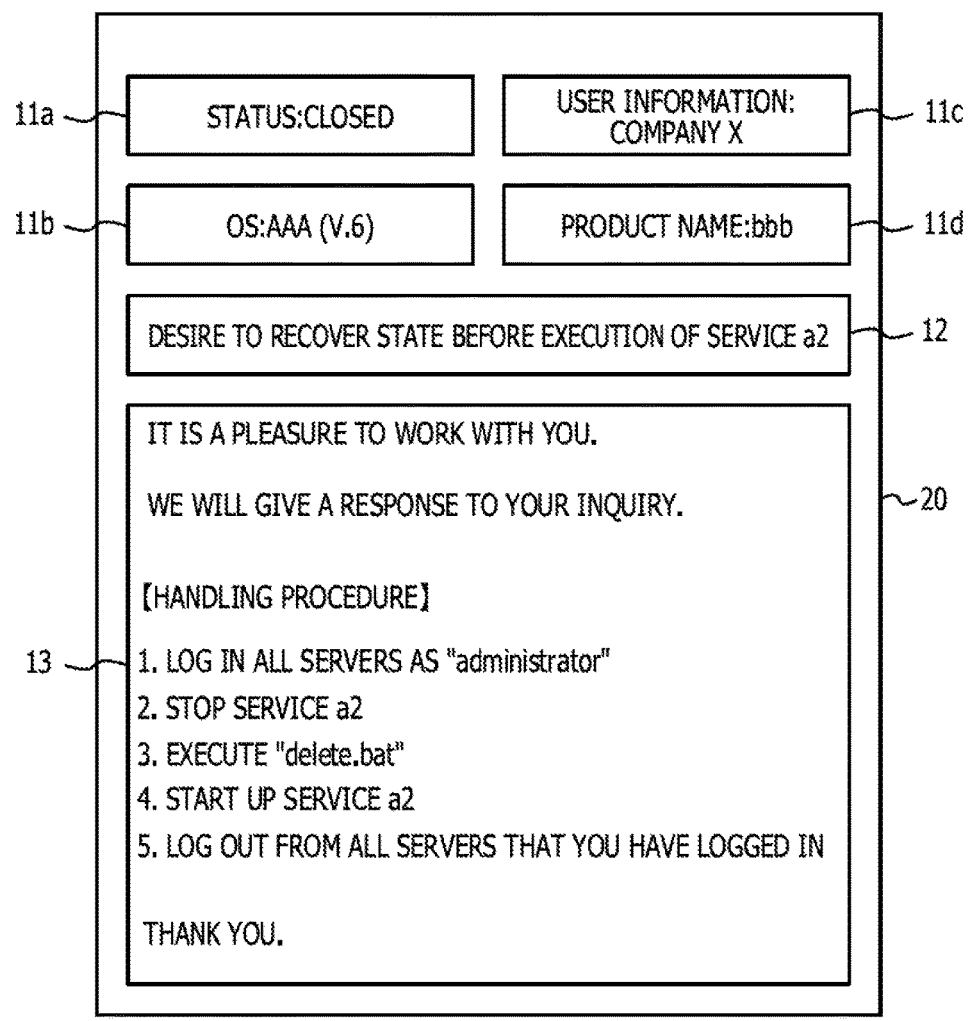
FIG. 3 is a diagram illustrating a specific example of incident information.

Next, a specific example of incident information will be described. FIGS. 2 and 3 are diagrams illustrating a specific example of incident information 20. A description will be given on the assumption that the incident information 20 illustrated in FIGS. 2 and 3 is incident information stored in advance in the storage unit is described in FIG. 1.

The incident information 20 illustrated in FIG. 2 includes a status column 11a for setting the status of an incident event, an OS information column lib for setting information regarding an OS operating as a portion of a business system which is used by a user, and a user information column 11c for setting identification information of a user. In addition, the incident information 20 illustrated in FIG. 2 includes a product information column 11d for setting a product name of middleware operating as a portion of a business system which is used by a user. Furthermore, the incident information 20 illustrated in FIG. 2 includes an event information column 12 for setting contents of an incident event, and a reply information column 13 for setting contents of a reply to a user.

Specifically, in the incident information 20 illustrated in FIG. 2, "status:closed" indicating that an incident event has been already solved is set in the status column 11a. In addition, "OS:BBB (V.2)" indicating that an OS of a business system is BBB and a version thereof is V.2 is set in the OS information column 11b. In addition, "user information: company Y" indicating that a user is a company Y is set in the user information column 11c, and "product name:bbb" indicating that a product name of middleware operating as a portion of a business system is bbb is set in the product information column 11d. In addition, contents of "desire to make system time retroactive to predetermined time" are set in the event information column 12.

Furthermore, contents of a reply given to a user by an operator are set in the reply information column 13. In the example illustrated in FIG. 2, "1. log in server as "root"", "2. stop service a2", and "3. execute "delete.sh"" are included as a method of solving an incident event generated. Furthermore, in the example illustrated in FIG. 2, "4. start up service a2", "5. log out from server", and "6. contact manager about login as "root"" are included as a method of solving a newly generated incident event. Meanwhile, hereinafter, each of the pieces of information obtained by the division of character information included in the reply information column 13 for each period (for example, "1. log in server as "root"" or "2. stop service a2") is also referred to as a term group.

Specific Example of Retrieval Method of Incident Information

Next, a description will be given of a specific example of a retrieval method when the information processing apparatus 1 retrieves incident information stored in the storage unit 1a. Hereinafter, a description will be given of a case where an incident event related to defective operation of a service a2 is generated in middleware operating as a portion of a business system in which an OS is BBB (V.2).

In this case, for example, an operator retrieves incident information in which the OS information column 11b is "BBB" and the reply information column 13 includes a term of "service a2". Thereby, the operator can retrieve incident information in which a method of solving a newly generated incident event is likely to be described. In this case, for example, the operator acquires incident information including the incident information 20 illustrated in FIG. 2.

Here, the above-mentioned business system is generally constituted by a plurality of components such as an OS, middleware, and an application. In addition, the same type of pieces of middleware may operate on different OSs, depending on configurations of business systems. Furthermore, in this case, contents of incident information may be different from each other depending on OSs having middleware operating thereon, in spite of pieces of incident information regarding incident events having the same contents.

Specifically, in the incident information 20 illustrated in FIG. 3, "status:closed" indicating that an incident event has been already solved is set in a status column 11a. In addition, "OS:AAA(V.6)" indicating that an OS of a business system is AAA and a version thereof is V.6 is set in the OS information column 11b. In addition, "user information: company X" indicating that a user is a company X is set in the user information column 11c, and "product name:bbb" indicating that a product name of middleware operating as a portion of a business system is bbb is set in the product information column 11d. In addition, contents of "desire to recover state before execution of service a2" are set in the event information column 12. That is, middleware corresponding to the incident information 20 illustrated in FIG. 3 is the same type as the middleware corresponding to the incident information 20 illustrated in FIG. 2, but the types of operating OSs thereof are different from each other.

In addition, in the reply information column 13, "1. log in server as "Administrator"", "2. stop service a2", and "3. execute "delete.bat"" are included as a method of solving a newly generated incident event. Furthermore, in the reply information column 13, "4. start up service a2" and "5. log out from all servers that are logged on" are included as a method of solving a newly generated incident event.

That is, not only is there a difference between "administrator" and "root" and a difference between "delete.bat" and "delete.sh", but also the same contents are set in the reply information column 13 of the incident information 20 illustrated in FIGS. 2 and 3. In a case where different terms in the respective pieces of incident information 20 have the same meaning, the same contents are set in the reply information column 13 of the incident information 20 illustrated in FIG. 2 and the reply information column 13 of the incident information 20 illustrated in FIG. 3. For this reason, in a case where an incident event related to defective operation of the service a2 occurs, it is preferable that an operator acquires not only the incident information 20 illustrated in FIG. 2, but also the incident information 20 illustrated in FIG. 3.

However, in a case where an operator retrieves incident information in which the OS information column 11b is "BBB" and "service a2" is included in the reply information column 13 as described above, it is difficult for the operator to retrieve the incident information illustrated in FIG. 3. In addition, for example, even when the operator retrieves incident information in which "delete.sh" is included in the reply information column 13, it is difficult for the operator to retrieve the incident information illustrated in FIG. 3. For this reason, even when incident information corresponding to an incident event having the same contents as those of a newly generated incident event is stored, the operator may not be able to retrieve appropriate incident information depending on a retrieval key or the like which is used during retrieval. Therefore, in this case, it is difficult for the operator to comprehensively acquire useful incident information.

Consequently, in the present embodiment, the information processing apparatus 1 creates correspondence information between a first term which is not included in common to each category (for example, for each OS in which middleware operates) and a second term which is a term included in common to each category, based on frequency information of terms included in incident information. The information processing apparatus 1 creates identical use information in which the first terms included for respective categories are associated with each other, based on the created correspondence information.

Thereby, for example, in a case where a first term is included in the retrieved incident information, the information processing apparatus 1 can extract other first terms corresponding to the first term included in the retrieved incident information, with reference to the identical use information. That is, for example, the information processing apparatus 1 can acquire a first term, corresponding to a category different from that of the retrieved incident information, which has the possibility of having the same meaning as that of the first term included in the retrieved incident information. In this case, the information processing apparatus 1 can prompt a user to perform re-retrieval based on the acquired first term (first term corresponding to a category different from that of the retrieved incident information). For this reason, an operator can retrieve incident information, which is useful for a newly generated incident event, over a wide range.

Hardware Configuration of Information Processing Apparatus

Figure 4:
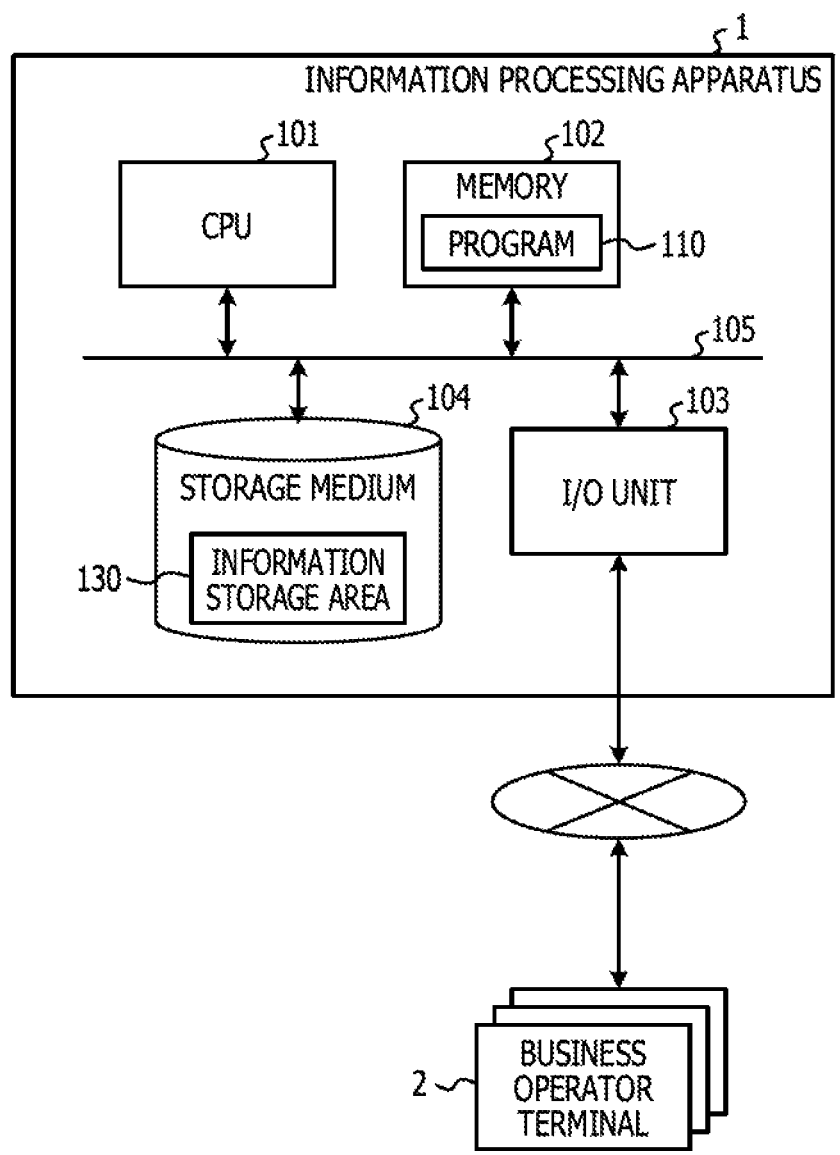
FIG. 4 is a diagram illustrating a hardware configuration of an information processing apparatus.

Next, a configuration of the information processing system 10 will be described. FIG. 4 is a diagram illustrating a hardware configuration of the information processing apparatus 1.

The information processing apparatus 1 includes a CPU 101 which is a processor, a memory 102, an external interface (I/O unit) 103, and a storage medium 104. These units are connected to each other through a bus 105.

The storage medium 104 stores a program 110 (hereinafter, also referred to as a retrieval support program 110) for performing a process (hereinafter, simply referred to as a retrieval support process) for supporting the retrieval of incident information, in a program storage area (not shown) within the storage medium 104.

As illustrated in FIG. 4, the CPU 101 loads the program 110 into the memory 102 from the storage medium 104 during the execution of the program 110, and performs a retrieval support process and the like in cooperation with the program 110.

The storage medium 104 includes an information storage area 130 (hereinafter, also referred to as a storage unit 130)

in which information used, for example, during the retrieval support process, is stored. Meanwhile, the storage unit is described in FIG. 1 corresponds to, for example, the information storage area 130. In addition, the external interface 103 communicates with the business operator terminal 2 through a network NW.

Software Configuration of Information Processing Apparatus

Figure 5:
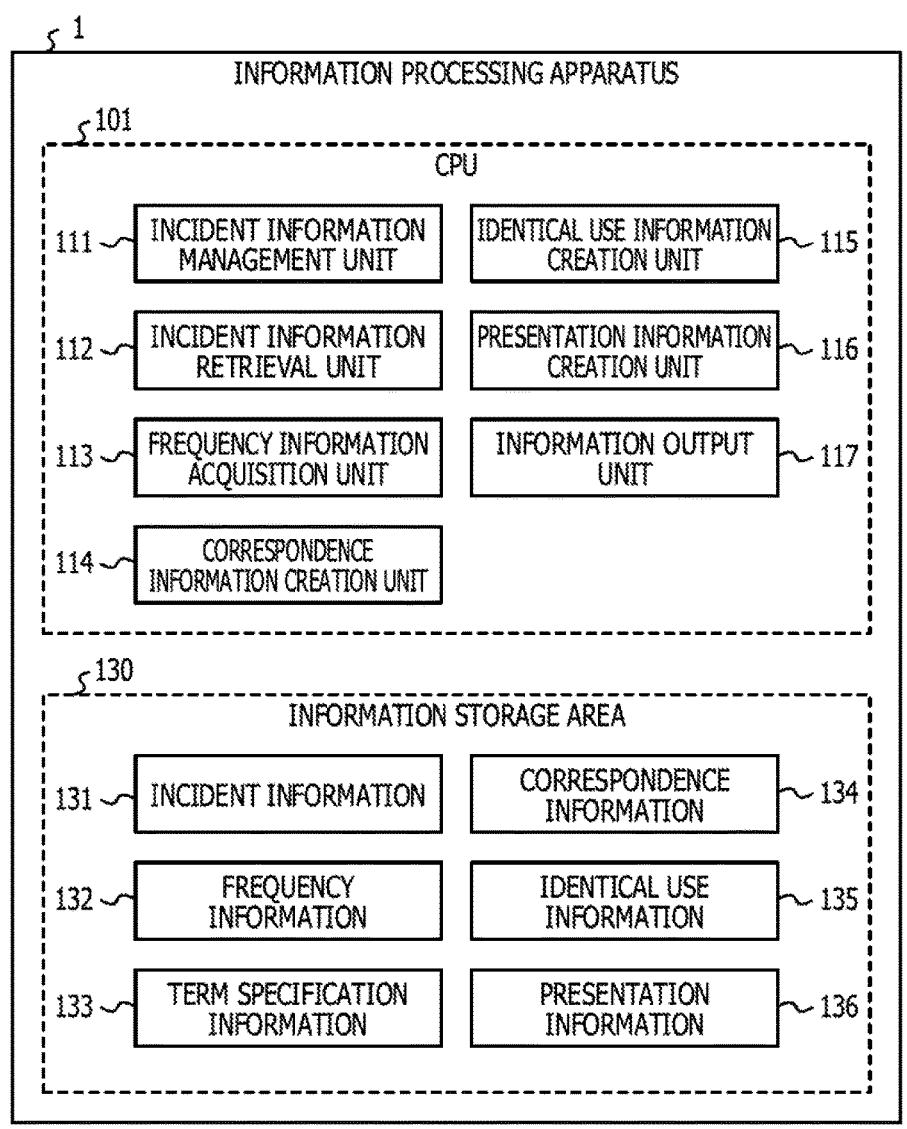
FIG. 5 is a functional block diagram of the information processing apparatus of FIG. 4.

Next, a software configuration of the information processing apparatus 1 will be described. FIG. 5 is a functional block diagram of the information processing apparatus 1 of FIG. 4. The CPU 101 cooperates with the program 110 to thereby operate as an incident information management unit 111, an incident information retrieval unit 112, a frequency information acquisition unit 113, a correspondence information creation unit 114, an identical use information creation unit 115, a presentation information creation unit 116, and an information output unit 117. In addition, incident information 131, frequency information 132, term specification information 133, correspondence information 134, identical use information 135, and presentation information 136 are stored in the information storage area 130 (hereinafter, referred to as the storage unit 130). Meanwhile, the incident information 20 described in FIGS. 2 and 3 corresponds to, for example, the incident information 131.

When the incident information management unit 111 receives the incident information 131 from the business operator terminal 2, the incident information management unit stores the received incident information in the information storage area 130. For example, the incident information management unit 111 classifies the incident information 131 for each category (for example, for each type of OS, for each version of an OS, for each type of middleware, for each type of application, or for each user making an inquiry) and stores the classified incident information. Meanwhile, hereinafter, a description will be given on the assumption that the incident information 131 is classified for each category and is stored in the information storage area 130. In addition, hereinafter, a description will be given on the assumption that each category is classified for each OS (for each type of OS).

When the incident information retrieval unit 112 receives a request for the execution of retrieval of the incident information 131 from the business operator terminal 2, the incident information retrieval unit retrieves the incident information 131 corresponding to the received request for the execution, from the incident information 131 stored in the information storage area 130. The request for the execution of retrieval which is transmitted from the business operator terminal 2 may be a request including, for example, information (for example, information which is set in the OS information column 11b or terms included in contents which are set in the reply information column 13) which is set in the incident information 20 described in FIGS. 2 and 3, as a retrieval key. The information processing apparatus 1 retrieves the incident information 131 based on, for example, a retrieval key included in the request for the execution of retrieval which is received in the business operator terminal 2.

The frequency information acquisition unit 113 acquires the frequency information 132 including the frequency of the occurrence of a term included in the incident information 131, based on the incident information 131 stored in the information storage area 130. Specifically, the frequency information acquisition unit 113 acquires, for example, the frequency information 132 for each OS. For example, the frequency information 132 is information indicating the percentage of pieces of incident information including respective terms in the pieces of incident information 131 corresponding to respective OSs. Thereby, as described later, the information processing apparatus 1 can create the correspondence information 134 or the identical use information 135 irrespective of deviation for each OS regarding the number of pieces of incident information 131 stored in the information storage area 130.

Thereafter, the frequency information acquisition unit 113 stores the acquired frequency information 132 in the information storage area 130. A specific example of the frequency information 132 will be described later.

The correspondence information creation unit 114 specifies a first term which is a term that is not included in common to each OS among terms included in the incident information 131 stored in the information storage area 130, based on the frequency information 132 acquired by the frequency information acquisition unit 113. In addition, the correspondence information creation unit 114 specifies a second term which is a term included in common to each OS among terms included in the incident information 131 stored in the information storage area 130. The correspondence information creation unit 114 associates a first term and a second term, which is included in the incident information 131 corresponding to the same incident event as that of the first term among the specified second terms, for each specified first term to thereby create the correspondence information 134 for each OS. Specifically, for example, the correspondence information creation unit 114 associates a first term included in the incident information 131 (incident information 131 corresponding to one incident event) which illustrated in FIG. 2 and a second term to thereby create the correspondence information 134 for each OS.

Thereafter, the correspondence information creation unit 114 stores the created correspondence information 134 in the information storage area 130. A specific example of the correspondence information 134 will be described later.

The identical use information creation unit 115 associates first terms included in respective pieces of incident information 131 for OSs with each other based on the correspondence information 134 created by the correspondence information creation unit 114 to thereby create the identical use information 135. Specifically, for example, the correspondence information creation unit 114 specifies combinations of pieces of the correspondence information 134 including a second term which is common to different categories, among pieces of the correspondence information 134. The correspondence information creation unit 114 associates first terms included in each of the specified combinations of pieces of the correspondence information 134 with each other to thereby create the identical use information 135.

Thereafter, the identical use information creation unit 115 stores the created identical use information 135 in the information storage area 130. A specific example of the identical use information 135 will be described later.

In a case where incident information 131 is retrieved, the presentation information creation unit 116 extracts a first term (hereinafter, also referred to as the presentation information 136) which is included in association with the first term included in the retrieved incident information 131, from the identical use information 135 created by the identical use information creation unit 115.

The information output unit 117 outputs the presentation information 136 extracted by the presentation information creation unit 116. A specific example of the presentation information 136 will be described later.

Outline of First Embodiment

Figure 6:
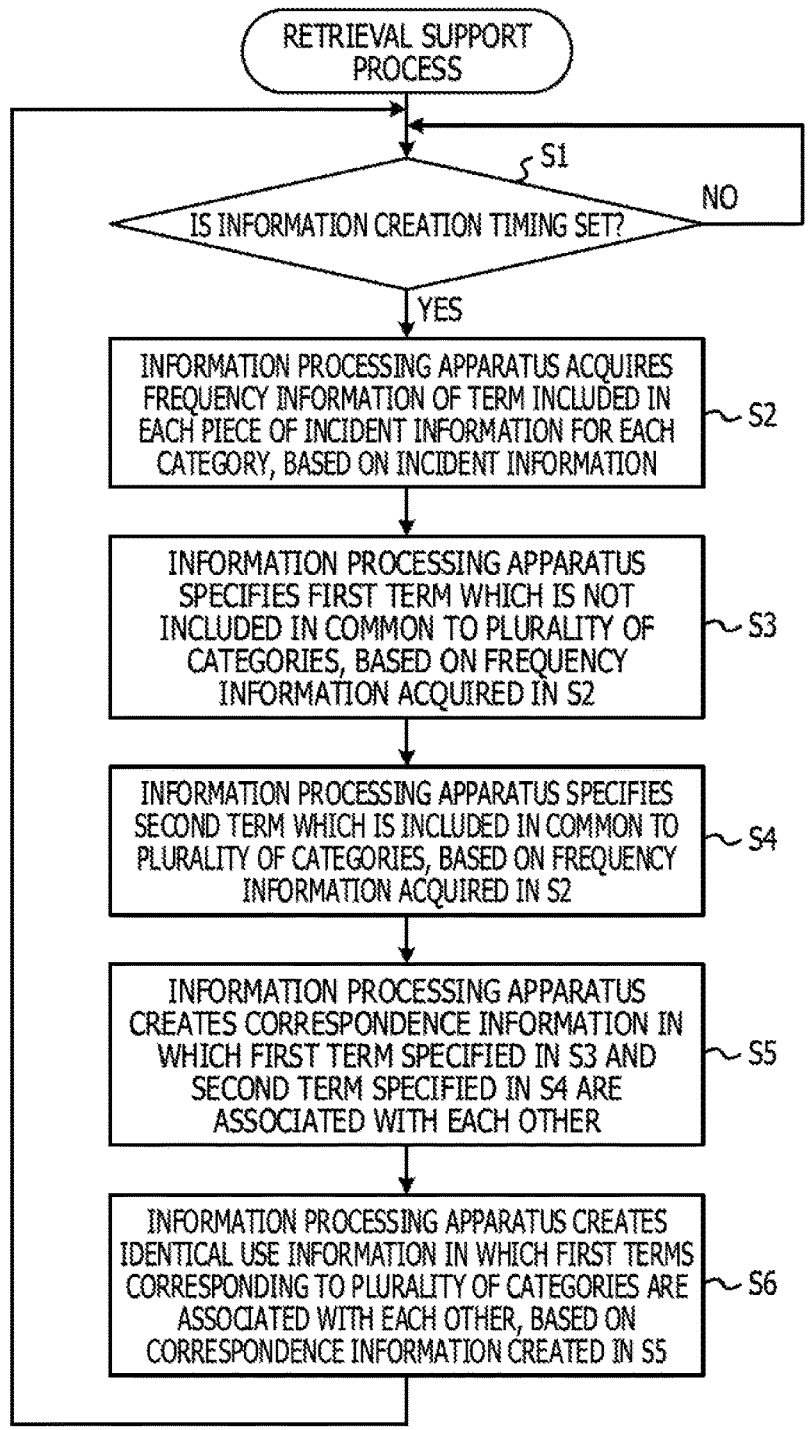
FIG. 6 is a flow chart illustrating an outline of a retrieval support process in a first embodiment.
Figure 7:
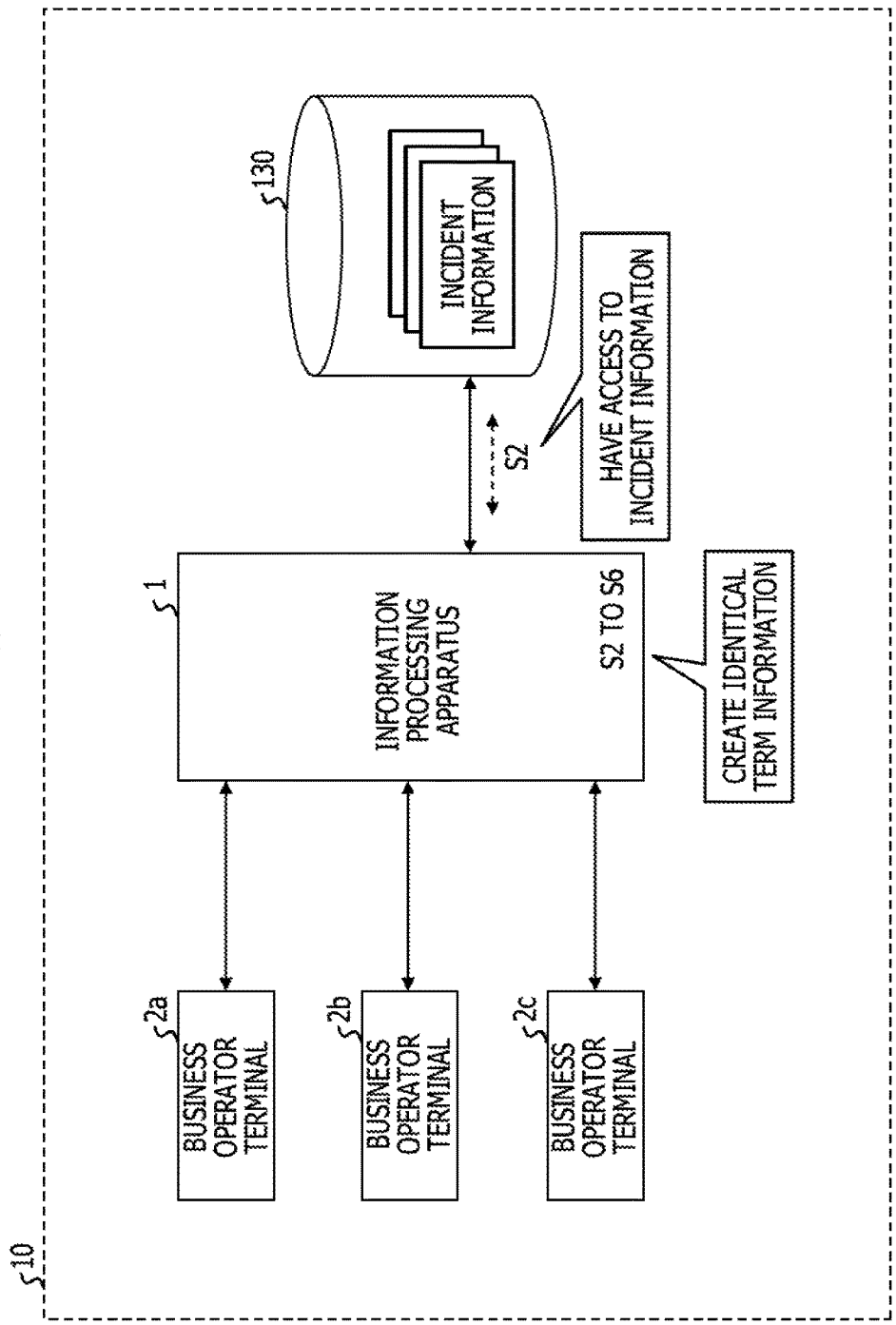
FIG. 7 is a diagram illustrating an outline of the retrieval support process in the first embodiment.

Next, an outline of a first embodiment will be described. FIG. 6 is a flow chart illustrating an outline of a retrieval support process in the first embodiment. In addition, FIG. 7 is a diagram illustrating an outline of the retrieval support process in the first embodiment. An outline of the retrieval support process of FIG. 6 will be described with reference to FIG. 7.

As illustrated in FIG. 6, the information processing apparatus 1 stands by until an information creation timing (NO in S1). The information creation timing may be a regular timing such as once a day. In addition, the information creation timing may be, for example, a time slot (for example, a time slot in which the number of times of retrieval of incident information 131 is small) in which a processing load of the information processing apparatus 1 is small.

Thereafter, in a case where an information creation timing is set (YES in S1), the information processing apparatus 1 has access to incident information 131 stored in the information storage area 130 as indicated by a dashed line arrow of FIG. 7. The information processing apparatus 1 acquires (creates) frequency information 132 including the frequency of the occurrence of each term included in the incident information 131, from information included in the incident information 131 (S2). A specific example of the frequency information 132 will be described later.

Next, the information processing apparatus 1 specifies a first term which is not included in common to each OS (category), based on the frequency information 132 acquired in S2 (S3). In addition, the information processing apparatus 1 specifies a second term included in common to each OS, based on the frequency information 132 acquired in S2 (S4). For example, the information processing apparatus 1 may specify terms other than the first term specified in S3 to thereby specify a second term. The information processing apparatus 1 creates the correspondence information 134 in which the first term specified in S3 and the second term specified in S4 are associated with each other (S5). A specific example of the correspondence information 134 will be described later.

That is, the information processing apparatus 1 classifies terms included in incident information 131 into a first term which is used as a term dependent on each OS (hereinafter, simply referred to as a dependent term) and a second term which is used as a general term (term which is not dependent on each OS). The information processing apparatus 1 creates the correspondence information 134 in which a first term and a second term included in the same incident information 131 are associated with each other, for each OS.

Thereby, for example, the information processing apparatus 1 can acquire a list of second terms (second terms included in the same incident information 131 as that of first terms) which are used simultaneously with first terms, for each OS, with reference to correspondence information 134. The information processing apparatus 1 can estimate a combination of first terms having contents of a list of second terms which are common to different OSs, to be a combination of first terms having the same meaning. That is, the information processing apparatus 1 can estimate a combination of terms that have the same meaning but are represented differently due to the difference between OSs in which middleware operates, or the like.

Thereafter, as illustrated in FIG. 7, the information processing apparatus 1 creates the identical use information 135 in which first terms corresponding to a plurality of categories are associated with each other, based on the correspondence information 134 created in S5 (S6). A specific example of the identical use information 135 will be described later.

That is, the information processing apparatus 1 creates the identical use information 135 including a combination of first terms which is considered to be a combination of terms having the same meaning. In a case where incident information 131 is retrieved by an operator, the information processing apparatus 1 provides information for prompting further execution of retrieval to the operator with reference to the identical use information 135. Thereby, the operator can acquire useful incident information 131 with a high level of accuracy in order to solve a newly generated incident event.

In this manner, according to the first embodiment, the information processing apparatus 1 acquires the frequency information 132 including the frequency of the occurrence of a term included in the incident information 131 for each of a plurality of categories, based on a plurality of pieces of the incident information 131 corresponding to a plurality of incident events. The information processing apparatus 1 creates the correspondence information 134 in which a first term and a second term, which is included in the incident information 131 corresponding to the same incident event as that of the first term among second terms, are associated with each other for each of a plurality of categories and each first term, based on the acquired frequency information 132. Furthermore, the information processing apparatus 1 creates the identical use information 135 in which first terms corresponding to the respective plurality of categories are associated with each other, based on the created correspondence information 134.

Thereby, the information processing apparatus 1 can allow an operator to retrieve useful incident information with a high level of accuracy in order to solve a newly generated incident event.

Details of First Embodiment

Next, details of the first embodiment will be described. FIGS. 8 to 11 are flow charts illustrating details of the retrieval support process in the first embodiment. In addition, FIGS. 11 to 22 are diagrams illustrating details of the retrieval support process in the first embodiment. The retrieval support process of FIGS. 8 to 11 will be described with reference to FIGS. 12 to 22.

Figure 8:
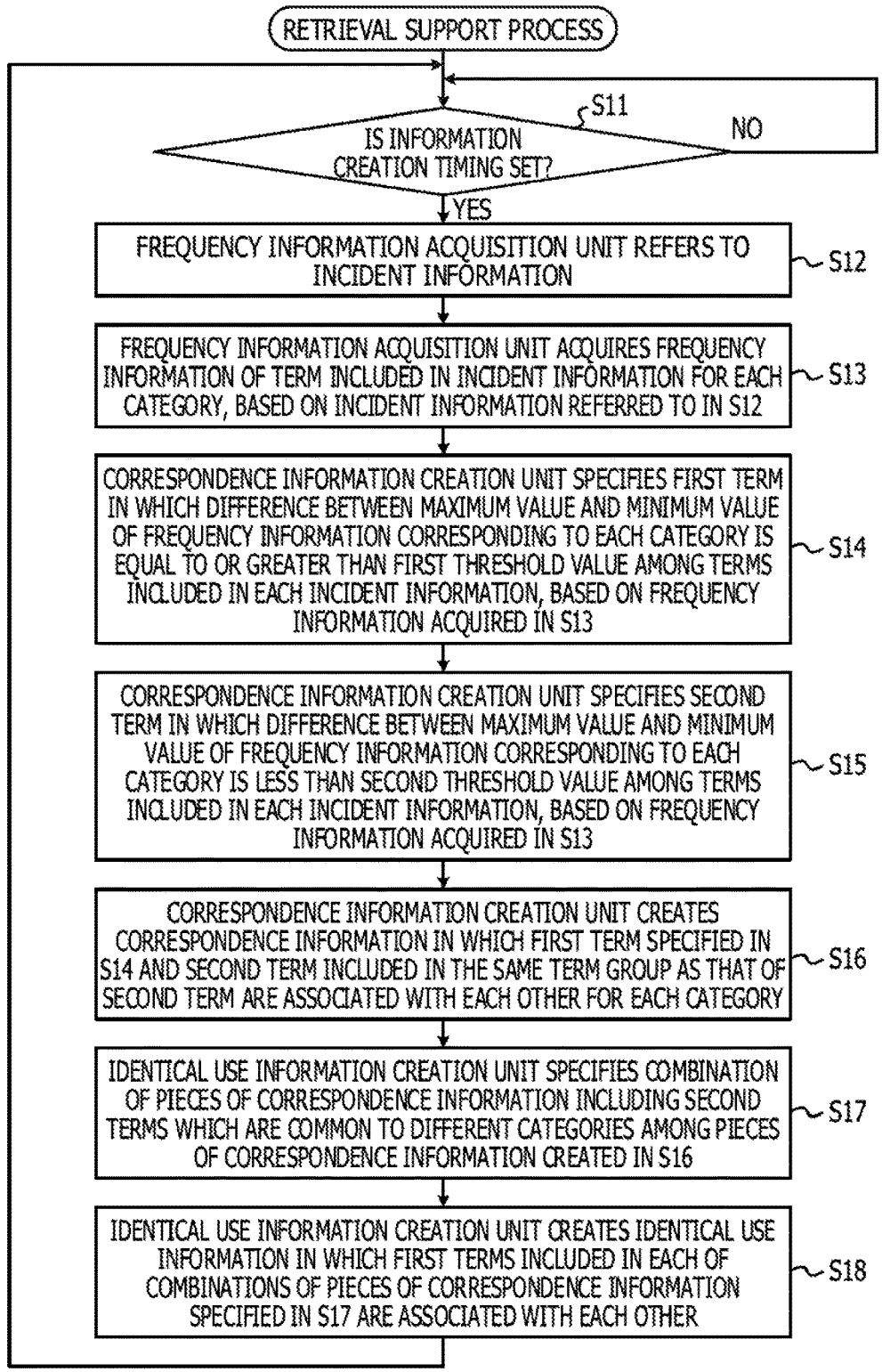
FIG. 8 is a flow chart illustrating details of the retrieval support process in the first embodiment.

Firstly, the frequency information acquisition unit 113 of the information processing apparatus 1 stands by until an information creation timing as illustrated in FIG. 8 (NO in S11). Thereafter, in a case where the information creation timing is set (YES in S11), the frequency information acquisition unit 113 refers to the incident information 131 stored in the information storage area 130 (S12). The frequency information acquisition unit 113 acquires the frequency information 132 of a term included in the incident information 131 for each OS, based on the incident information 131 referred to in S12 (S13). Hereinafter, a specific example of the frequency information 132 will be described.

FIGS. 12 and 13 are diagrams illustrating a specific example of the frequency information 132. FIG. 12 is a diagram illustrating a specific example of frequency information 132a in a case where an OS is BBB (V.2). In addition, FIG. 13 is a diagram illustrating a specific example of frequency information 132b in a case where an OS is AAA (V.6).

The frequency information 132a illustrated in FIG. 12 includes "ID" which is information for identifying each information included in the frequency information 132a, "term" indicating a term included in the incident information 131, and "frequency of occurrence" indicating the frequency of occurrence of a term in the incident information 131, as items. For example, an item which is set in "frequency of occurrence" is the percentage of incident information 131 including each term which is set in "term" in pieces of incident information 131 in which an OS information column 11b is "BBB (V.2)". Meanwhile, in the examples illustrated in FIGS. 12 and 13, a unit of information which is set in "frequency of occurrence" is % (percent).

Specifically, in the frequency information 132a illustrated in FIG. 12, "server" is set as "term" and "95" is set as "frequency of occurrence" in information in which "ID" is "1". In addition, in the frequency information 132a illustrated in FIG. 12, "root" is set as "term" and "98" is set as "frequency of occurrence" in information in which "ID" is "2". A description of other pieces of information in FIG. 12 will be omitted. In addition, the frequency information 132b illustrated in FIG. 13 has the same contents as those of the frequency information 132a described in FIG. 12, and thus a description thereof will be omitted.

Referring back to FIG. 8, the correspondence information creation unit 114 of the information processing apparatus 1 specifies a first term based on terms included in incident information 131 stored in the information storage area 130, by the frequency information 132 acquired in S13 (S14). Specifically, the correspondence information creation unit 114 specifies, as a first term, a term in which the difference between a maximum value and a minimum value of the frequency information 132 corresponding to each category is equal to or greater than a predetermined threshold value (hereinafter, also referred to as a first threshold value), among the terms included in incident information 131 (S14). Hereinafter, a description will be given of a specific example in a case where the process of S14 is performed, with reference to the frequency information 132 described in FIGS. 12 and 13.

Details of Process of S14

Figure 10:
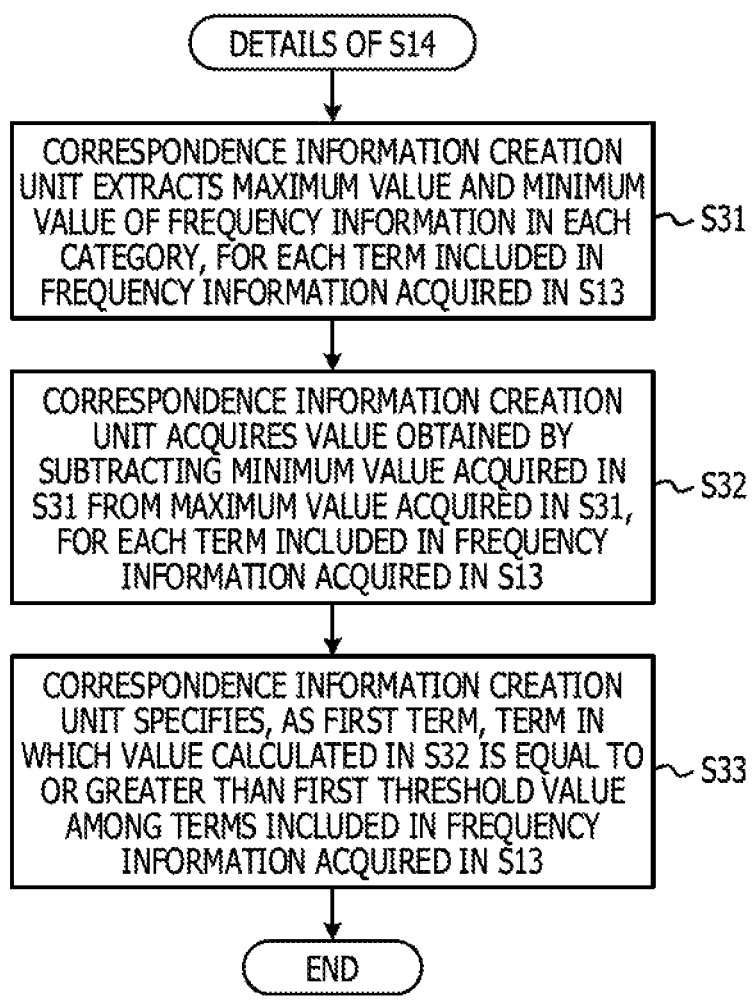
FIG. 10 is a flow chart illustrating details of the retrieval support process in the first embodiment.

FIG. 10 is a flow chart illustrating details of the process of S14. As illustrated in FIG. 10, the correspondence information creation unit 114 extracts a maximum value and a minimum value of the frequency information 132 (value corresponding to "frequency of occurrence" included in the frequency information 132) which corresponds to each OS, for each term included in the frequency information 132 acquired in S13 (S31).

Specifically, in the frequency information 132a illustrated in FIG. 12 and the frequency information 132b illustrated in FIG. 13, "frequency of occurrence" corresponding to information in which "term" is "server" are "95" and "90". For this reason, in this case, the correspondence information creation unit 114 extracts "95" as a maximum value and extracts "90" as a minimum value. Similarly, in the frequency information 132a illustrated in FIG. 12 and the frequency information 132b illustrated in FIG. 13, "frequencies of occurrence" corresponding to information in which "term" is "root" are "98" and "0.4". For this reason, in this case, the correspondence information creation unit 114 extracts "98" as a maximum value and extracts "0.4" as a minimum value.

Next, the correspondence information creation unit 114 acquires a value (hereinafter, also referred to as a subtraction value) which is obtained by subtracting the minimum value acquired in S31 from the maximum value acquired in S31, for each term included in the frequency information 132 acquired in S13 (S32).

Specifically, in the frequency information 132a illustrated in FIG. 12 and the frequency information 132b illustrated in FIG. 13, a maximum value of "frequency of occurrence" corresponding to information in which "term" is "server" is "95", and a minimum value of "frequency of occurrence" corresponding to information in which "term" is "server" is "90". For this reason, the correspondence information creation unit 114 acquires "5" as a subtraction value. In addition, in the frequency information 132a illustrated in FIG. 12 and the frequency information 132b illustrated in FIG. 13, a maximum value of "frequency of occurrence" corresponding to information in which "term" is "root" is "98", and a minimum value of "frequency of occurrence" corresponding to information in which "term" is "server" is "0.4". For this reason, the correspondence information creation unit 114 acquires "97.6" as a subtraction value.

The correspondence information creation unit 114 performs the same processing on other "terms". Specifically, the correspondence information creation unit 114 calculates "89.8", "3", "69.9", "38", "1", and "6" as subtraction values corresponding to "administrator", "login", "start.sh", "delete.bat", "execution", and "manager", respectively. In addition, the correspondence information creation unit 114 calculates "0.8", "0.7", "70.8", and "63.8" as subtraction values corresponding to "administrator", "roat", "start. bat", and "delete.sh", respectively. Furthermore, the correspondence information creation unit 114 calculates "8", "6", "7", "3", "3", "4", and "4" as subtraction values corresponding to "interruption", "recovery", "contact", "logout", "startup", "stop", and "service a2", respectively.

Subsequently, the correspondence information creation unit 114 specifies, as a first term, a term in which the value calculated in S32 is equal to or greater than a first threshold value among terms included in the frequency information 132 acquired in S13 (S33). Hereinafter, a description will be given on the assumption that the first threshold value is 20.

Specifically, in the frequency information 132a illustrated in FIG. 12 and the frequency information 132b illustrated in FIG. 13, the correspondence information creation unit 114 specifies, as first terms, "root", "administrator", and "start.sh" which are terms corresponding to values equal to or greater than 20 among the values calculated in S32. Furthermore, the correspondence information creation unit 114 specifies, as first terms, "delete.bat", "start.bat", and "delete.sh" which are terms corresponding to values equal to or greater than 20 among the values calculated in S32.

Thereby, the correspondence information creation unit 114 can specify a first term which is a dependent term, among terms included in incident information 131 stored in the information storage area 130.

Referring back to FIG. 8, the correspondence information creation unit 114 specifies a second term in which the difference between a maximum value and a minimum value of the frequency information 132 corresponding to each category is less than a first threshold value, among terms included in each piece of incident information 131, for example, based on the frequency information 132 acquired in S13 (S15). That is, the correspondence information creation unit 114 specifies a term in which the difference between a maximum value and a minimum value of frequency information 132 corresponding to each OS is smaller than the first threshold value, as a second term which is a term that is not dependent on each OS.

Specifically, in the examples illustrated in FIGS. 12 and 13, the correspondence information creation unit 114 specifies, for example, "server", "login", "execution", and "manager" which are terms other than the terms specified as first terms, as second terms. Furthermore, in the examples illustrated in FIGS. 12 and 13, the correspondence information creation unit 114 specifies, for example, "administrator", "roat", "interruption", "recovery", "contact", "logout", "startup", "stop", and "service a2" as second terms.

Meanwhile, the correspondence information creation unit 114 may specify, as second terms, only terms in which all of the pieces of the frequency information 132 (values corresponding to "frequency of occurrence" included in the frequency information 132) which correspond to each category are equal to or greater than a predetermined threshold value (hereinafter, also referred to as a second threshold value) among the terms specified as second terms in S15. Hereinafter, a description will be given on the assumption that the second threshold value is 10.

Specifically, in the examples illustrated in FIGS. 12 and 13, "administrator" has "frequencies of occurrence" of "0.1" and "0.9". In addition, in the examples illustrated in FIGS. 12 and 13, "roat" has "frequencies of occurrence" of "0.8" and "0.1". For this reason, the correspondence information creation unit 114 may not specify, for example, "administrator" and "roat" as second terms. In this case, the correspondence information creation unit 114 may specify only "server", "login", "execution", "manager", "interruption", "recovery", "contact", "logout", "startup", "stop", and "service a2" as second terms.

Thereby, as described later, the information processing apparatus 1 can create the identical use information 135 with a high level of accuracy. In addition, in a case where retrieved incident information 131 includes a misspelling, the information processing apparatus 1 can output the effect as described later.

In addition, the correspondence information creation unit 114 may create the term specification information 133 illustrated in FIG. 14 from the pieces of information acquired in S14 and S15.

The term specification information 133 illustrated in FIG. 14 includes "ID" which is information for identifying each information included in the term specification information 133 and "term" indicating a term included in incident information 131, as items. In addition, term specification information 133 illustrated in FIG. 14 includes "frequency of occurrence (BBB (V.2))" and "frequency of occurrence (AAA (V.6))" indicating the frequency of the occurrence in incident information 131 corresponding to each OS, and "subtraction value" indicating the subtraction value calculated in S32, as items. Furthermore, the term specification information 133 illustrated in FIG. 14 includes "specification results" which are results specified in S33 and S15, as items. In addition, not only "second term" and "first term" but also "misspelling" is set in "specification result" illustrated in FIG. 14.

Specifically, in the term specification information 133 illustrated in FIG. 14, "server" is set as "term", "95" is set as "frequency of occurrence (BBB (V.2))", and "90" is set as "frequency of occurrence (AAA (V.6))" in information in which "ID" is "1". In addition, in the term specification information 133 illustrated in FIG. 14, "5" is set as "subtraction value", and "second term" is set as "specification result" in information in which "ID" is "1". A description of the other pieces of information of FIG. 14 will be omitted.

Referring back to FIG. 8, for example, the correspondence information creation unit 114 creates the correspondence information 134 in which the first term specified in S14 and the second term included in the same term group as that of the first term are associated with each other, for each OS (S16). Hereinafter, details of the process of S16 will be described with reference to the pieces of incident information 20 illustrated in FIGS. 2 and 3.

Details of Process of S16

Figure 11:
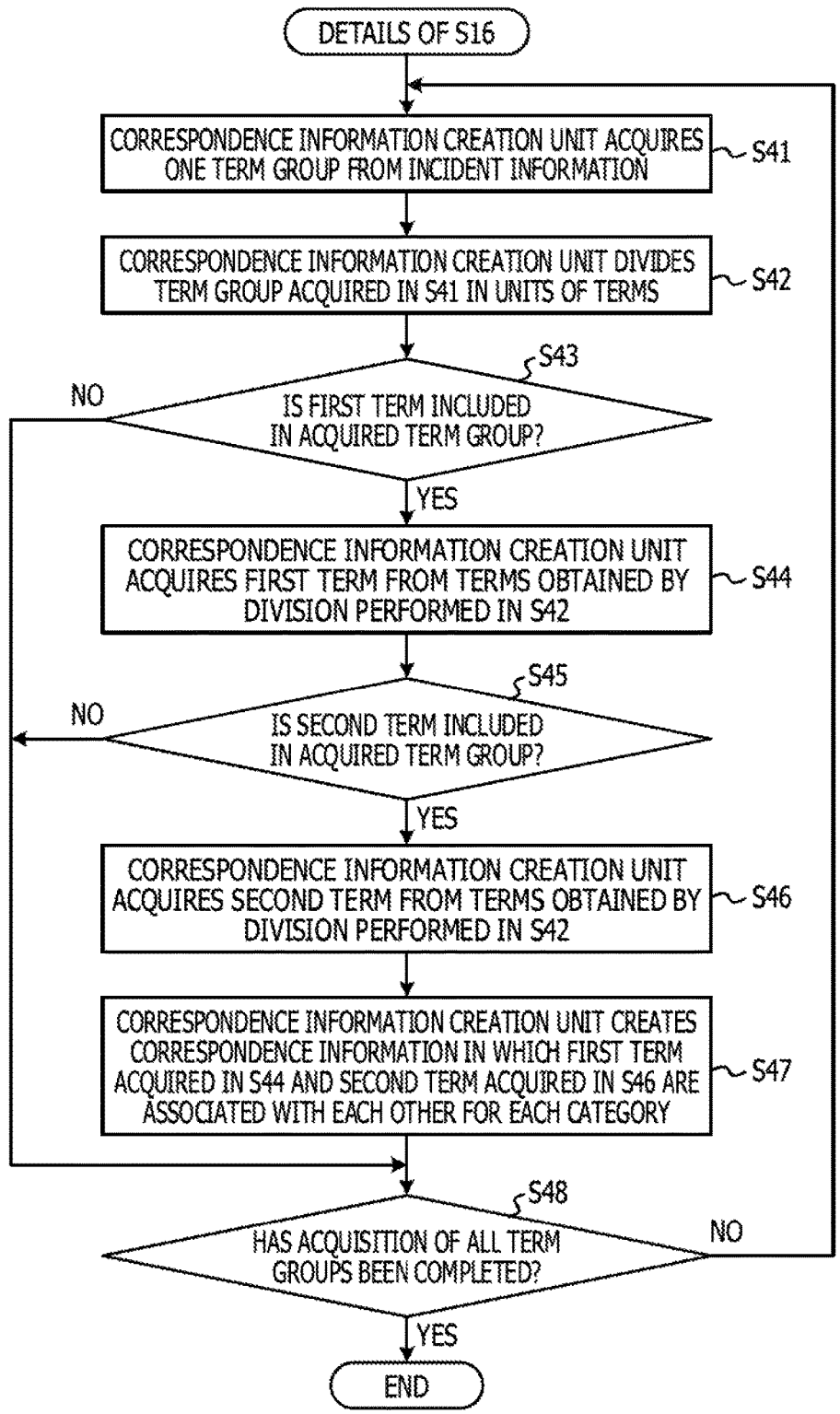
FIG. 11 is a flow chart illustrating details of the retrieval support process in the first embodiment.

FIG. 11 is a flow chart illustrating details of the process of S16. As illustrated in FIG. 11, the correspondence information creation unit 114 acquires one term group from incident information 131 stored in the information storage area 130 (S41).

Specifically, the incident information 20 (incident information in which an OS is BBB (V.2)) illustrated in FIG. 2 includes "1. log in server as "root"", "2. stop service a2", and "3. execute "delete.sh"" as term groups. Furthermore, the incident information 20 illustrated in FIG. 2 includes "4. start up service a2", "5. log out from server", and "6. contact manager about login as "root"" as term groups. For this reason, the correspondence information creation unit 114 firstly acquires "1. log in server as "root"" as a term group.

Next, the correspondence information creation unit 114 divides the term group acquired in S41 in units of terms (S42). The correspondence information creation unit 114 may perform, for example, morphological analysis to thereby divide the term group. Specifically, in the example illustrated in FIG. 2, the correspondence information creation unit 114 divides, for example, "1. log in server as "root"" which is the term group acquired in S41 into "server", "root", and "login".

Subsequently, the correspondence information creation unit 114 determines whether or not the terms obtained by the division performed in S42 include a first term (S43). In a case where the first term is included (YES in S43), the correspondence information creation unit 114 acquires the first term from the terms obtained by the division performed in S42 (S44).

Specifically, the correspondence information creation unit 114 acquires information indicating that "root" is a first term with reference to, for example, term specification information 133 illustrated in FIG. 14. The correspondence information creation unit 114 acquires "root" as a first term among "server", "root", and "login" which are terms obtained by the division performed in S42.

Next, the correspondence information creation unit 114 determines whether or not the terms obtained by the division performed in S42 include a second term (S45). In a case where the second term is included (YES in S45), the correspondence information creation unit 114 acquires the second term from the terms obtained by the division performed in S42 (S46).

Specifically, the correspondence information creation unit 114 acquires information indicating that "server" and "login" are second terms with reference to, for example, the term specification information 133 illustrated in FIG. 14. The correspondence information creation unit 114 acquires "server" and "login" as second terms from "server", "root", and "login" which are terms obtained by the division performed in S42. Meanwhile, the correspondence information creation unit 114 may acquire terms other than the first term acquired in S44 among the terms obtained by the division performed in S42, as second terms.

The correspondence information creation unit 114 associates the first term acquired in S44 and the second term acquired in S46 with each other to thereby create the correspondence information 134 for each OS (S47). Hereinafter, a specific example of the correspondence information 134 will be described with reference to FIGS. 15 to 19.

FIGS. 15 to 18 are diagrams illustrating specific examples of correspondence information 134a in a case where an OS is BBB (V.2). In addition, FIG. 19 is a diagram illustrating a specific example of correspondence information 134b in a case where an OS is AAA (V.6). The correspondence information 134a illustrated in FIGS. 15 to 18 and the correspondence information 134b illustrated in FIG. 19 include "ID" for identifying each piece of information, "first term" indicating a first term acquired in S44, and "second term" indicating a second term acquired in S46, as items.

Specifically, as illustrated in FIG. 15, the correspondence information creation unit 114 creates the correspondence information 134a (information in which "ID" is "1") in which, for example, "root" acquired in S44 is associated with "server" and "login" acquired in S46.

Referring back to FIG. 11, in a case where the terms obtained by the division performed in S42 do not include a first term (NO in S43), the correspondence information creation unit 114 does not perform the processes of S44 to S47. In addition, in a case where the terms obtained by the division performed in S42 do not include a second term (NO in S45), the correspondence information creation unit 114 does not perform the processes of S46 and S47.

Thereafter, the correspondence information creation unit 114 determines whether or not processing has been performed on all of the term groups included in incident information 131 stored in the information storage area 130 (S48). In a case where processing has not been completed on all of the term groups (NO in S48), the correspondence information creation unit 114 acquires the next term group (S41), and repeats the process of S42 and the subsequent processes.

Specifically, in the example illustrated in FIG. 2, the correspondence information creation unit 114 acquires, for example, "2. stop service a2" which is a term group into "service a2" and "stop" (S41 and S42). The correspondence information creation unit 114 acquires information indicating that "service a2" and "stop" are second terms (information indicating that "service a2" and "stop" are not first terms) with reference to the term specification information 133 illustrated in FIG. 14. Therefore, in this case, the correspondence information creation unit 114 does not perform the processes of S44 to S47 (NO in S43).

Next, in the example illustrated in FIG. 2, the correspondence information creation unit 114 acquires, for example, "3. "delete.sh"" and divides the acquired "3. "delete.sh"" into "delete.sh" and "execution" (S41 and S42). The correspondence information creation unit 114 acquires information indicating "delete.sh" is a first term and "execution" is a second term with reference to the term specification information 133 illustrated in FIG. 14. For this reason, as illustrated in FIG. 16, the correspondence information creation unit 114 creates the correspondence information 134a (information indicating that "ID" is "2") in which "delete.sh" which is the first term acquired in S46 and "execution" which is the second term acquired in S44 are associated with each other (S47).

Subsequently, in the example illustrated in FIG. 2, the correspondence information creation unit 114 acquires, for example, "4. start up service a2", and divides the acquired "4. start up service a2" into "service a2" and "startup" (S41, S42). The correspondence information creation unit 114 acquires information indicating that "service a2" and "startup" are second terms with reference to the term specification information 133 illustrated in FIG. 14. For this reason, the correspondence information creation unit 114 does not perform the processes of S44 to S47 (NO in S43).

Furthermore, in the example illustrated in FIG. 2, the correspondence information creation unit 114 acquires, for example, "5. log out from server" and divides the acquired "5. log out from server" into "server" and "logout" (S41 and S42). The correspondence information creation unit 114 acquires information indicating that "server" and "logout" are first information with reference to the term specification information 133 illustrated in FIG. 14. For this reason, the correspondence information creation unit 114 does not perform the processes of S44 to S47 (NO in S43).

In the example illustrated in FIG. 2, the correspondence information creation unit 114 acquires "6. contact manager about log in as "root"" and divides the acquired "6. contact manager about log in as "root"" into "root", "login", "manager", and "contact" (S41 and S42). The correspondence information creation unit 114 acquires information indicating that "root" is a first term and "login", "manager", and "contact" are second terms with reference to the term specification information 133 illustrated in FIG. 14. For this reason, as illustrated in FIG. 17, the correspondence information creation unit 114 creates the correspondence information 134a (information in which "ID" is "1") in which "root" which is the first term acquired in S46 is associated with "manager" and "contact" which are second terms acquired in S44.

Here, in the pieces of correspondence information 134a illustrated in FIGS. 15 and 16, information in which "root" is set as a first term is present (information in which "ID" is "1"). For this reason, as illustrated in FIG. 17, the correspondence information creation unit 114 associates only "manager" and "contact", which are second terms for which the correspondence information 134a has not been yet created among "login", "manager", and "contact" which are the second terms acquired in S44, with information in which "ID" is "1". Thereby, the correspondence information creation unit 114 can perform management in such a way that a first term corresponding to each OS and a second term included in the same term group as that of the first term are arranged.

In a case where a process is performed on all term groups included in incident information 131 stored in the information storage area 130 (YES in S48), the correspondence information creation unit 114 terminates the process in S16. In this case, for example, correspondence information 134 for each OS is created as in correspondence information 134a illustrated in FIG. 18 and correspondence information 134b illustrated in FIG. 19. Thereby, as described later, the identical use information creation unit 115 can compare pieces of correspondence information 134 created for respective OSs with each other to thereby associate terms depending on the respective OSs.

Referring back to FIG. 8, the identical use information creation unit 115 of the information processing apparatus 1 specifies a combination of pieces of correspondence information including second terms which are common to different categories among the pieces of correspondence information 134 created in S16 (S17).

Specifically, the identical use information creation unit 115 extracts two pieces of information (hereinafter, also referred to as first correspondence information and second correspondence information) which are included in the correspondence information 134 created in S16. The identical use information creation unit 115 calculates the percentage of second terms included in common to the first correspondence information, and the second correspondence information in second terms included in either the extracted first correspondence information or second correspondence information. As a result, in a case where the calculated percentage is equal to or greater than a predetermined threshold value (hereinafter, also referred to as a third threshold value), the identical use information creation unit 115 determines that a combination of the first correspondence information and the second correspondence information is a combination to be specified. The identical use information creation unit 115 performs this determination on all combinations in information included in the correspondence information 134 created in S16.

Thereafter, the identical use information creation unit 115 associates first terms included in each of the combinations of the pieces of correspondence information 134 specified in S17 with each other to thereby create identical use information 135 (S18). Hereinafter, a description will be given of specific examples of the processes of S17 and S18 in a case where the third threshold value is 45(%), with reference to FIGS. 18 and 19.

Firstly, a description will be given of a case where information in which "ID" is "1" in the correspondence information 134*a* illustrated in FIG. 18 is compared with information in which "ID" is "1" in the correspondence information 134*b* illustrated in FIG. 19.

In this case, the identical use information creation unit 115 specifies "server", "login", "manager", and "contact" as "second terms" corresponding to information in which "ID" is "1" in the correspondence information 134*a*. In addition, the identical use information creation unit 115 specifies "server", "login", "manager", "user", and "domain" as "second terms" corresponding to information in which "ID" is "1" in the correspondence information 134*b*.

Subsequently, the identical use information creation unit 115 calculates the percentage of "second terms" which are common to the correspondence information 134*a* and the correspondence information 134*b* among "server", "login", "manager", "contact", "user", and "domain" which are all of the specified "second terms". Specifically, "second terms" which are common to the correspondence information 134*a* and the correspondence information 134*b* are "server", "login", "manager", and thus the identical use information creation unit 115 calculates "50(%)" as the percentage of the common "second terms". The identical use information creation unit 115 determines that the calculated percentage is equal to or greater than 45(%). For this reason, the identical use information creation unit 115 determines information in which "ID" is "1" in the correspondence information 134*a* and information in which "ID" is "1" in the correspondence information 134*b* as a combination of pieces of correspondence information 134 in which the percentage of common second terms is equal to or greater than the third threshold value.

Next, a description will be given of a case where information in which "ID" is "1" in the correspondence information 134*a* illustrated in FIG. 18 is compared with information in which "ID" is "2" in the correspondence information 134*b* illustrated in FIG. 19.

In this case, the identical use information creation unit 115 specifies "server", "login", "manager", and "contact" as "second terms" corresponding to information in which "ID" is "1" in the correspondence information 134*a*. In addition, the identical use information creation unit 115 specifies "server", "execution", and "recovery" as "second terms" corresponding to information in which "ID" is "2" in the correspondence information 134*b*.

Subsequently, the identical use information creation unit 115 calculates the percentage of "second terms" which are common to the correspondence information 134*a* and the correspondence information 134*b* among "server", "login", "manager", "contact", "execution", and "recovery" which are the specified "second terms". Specifically, only "server" is a "second term" which is common to the correspondence information 134*a* and the correspondence information 134*b*, and thus the identical use information creation unit 115 calculates "17(%)" (2 significant digits) as the percentage of common "second terms". For this reason, the identical use information creation unit 115 does not specify information in which "ID" is "1" in the correspondence information 134*a* and information in which "ID" is "2" in the correspondence information 134*b* as a combination of pieces of correspondence information 134 in which the percentage of common second terms is equal to or greater than the third threshold value.

Thereafter, the identical use information creation unit 115 determines whether or not the percentage of common second terms is equal to or greater than the third threshold value, with respect to combinations of all terms which are set in "first term" of correspondence information 134*a* and all terms which are set in "first term" of correspondence information 134*b*. Hereinafter, a description will be given on the assumption that only a combination of information in which "ID" is "1" in the correspondence information 134*a* and information in which "ID" is "1" in the correspondence information 134*b* is specified as a combination of pieces of correspondence information 134 in which the percentage of common second terms is equal to or greater than the third threshold value.

Next, the identical use information creation unit 115 specifies "root" which is a "first term" corresponding to information in which "ID" is "1" in the correspondence information 134*a* and "administrator" which is a "first term" corresponding to information in which "ID" is "1" in the correspondence information 134*b*. The identical use information creation unit 115 associates the specified "root" and "administrator" with each other to thereby create identical use information 135. Hereinafter, a specific example of the identical use information 135 will be described.

FIG. 20 is a diagram illustrating a specific example of the identical use information 135. The identical use information 135 illustrated in FIG. 20 includes, as items, "ID" for identifying each piece of information included in the identical use information 135, and "first term (BBB (V.2))" and "first term (AAA (V.6))" that indicate first terms for each OS.

Specifically, the identical use information creation unit 115 sets "root" in "first term (BBB (V.2))" in association with information in which "ID" is "1", and sets "administrator" in "first term (AAA (V.2))".

That is, the identical use information creation unit 115 determines that "root" and "administrator" are the terms having the same contents but are different terms dependent on an OS. Thereby, as described later, the information processing apparatus 1 can prompt a user to perform re-retrieval of incident information 131 based on the created identical use information 135.

Retrieval Support Process in Case where Retrieval of Incident Information 131 is Performed Next, a description will be given of a retrieval support process in a case where the retrieval of incident information 131 is performed by a user.

Figure 9:
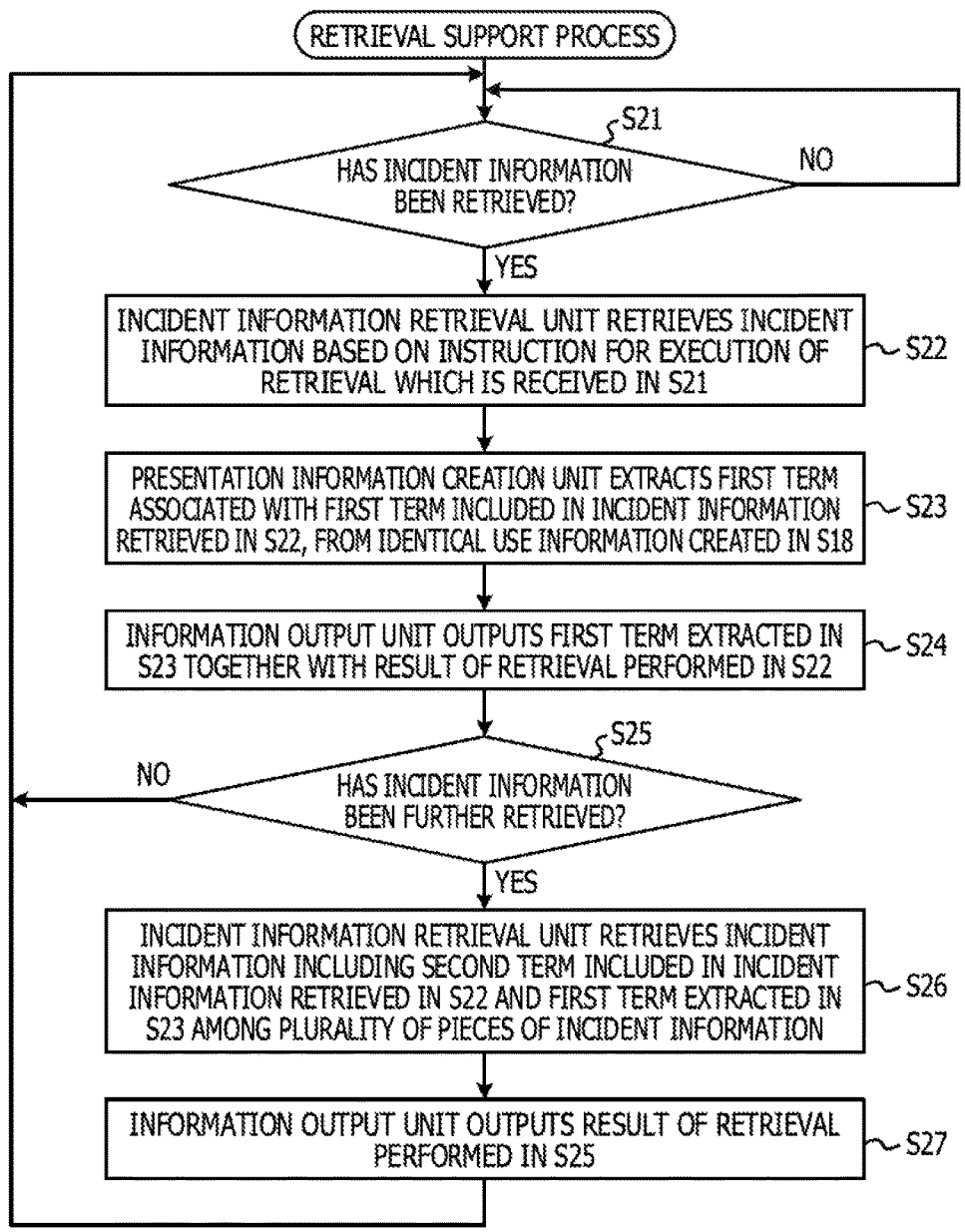
FIG. 9 is a flow chart illustrating details of the retrieval support process in the first embodiment.

As illustrated in FIG. 9, the presentation information creation unit 116 of the information processing apparatus 1 stands by until a user retrieves the incident information 131 (NO in S21). Specifically, the presentation information creation unit 116 stands by until receiving a request for the execution of retrieval of incident information 131 from the business operator terminal 2. Thereafter, in a case where the presentation information creation unit has received the request for the execution of retrieval of the incident information 131 (YES in S21), the incident information retrieval unit 112 retrieves the incident information 131 based on the request for the execution of retrieval which is received in S21 (S22).

The presentation information creation unit 116 extracts a first term associated with a first term included in the incident information 131 retrieved in S22, from the identical use information 135 created in S18 (S23).

Specifically, in a case where the incident information 131 (incident information in which BBB (V.2) is set in the OS information column 11b) which is retrieved based on the request for the execution of retrieval which is transmitted from the business operator terminal 2 includes "root", the presentation information creation unit 116 refers to the identical use information 135 illustrated in FIG. 20. The presentation information creation unit 116 extracts "administrator" which is a "first term" set in association with "root".

Thereafter, the information output unit 117 of the information processing apparatus 1 outputs the first term (presentation information 136) which is extracted in S23, together with a result of the retrieval of the incident information 131 which is performed in S22 (S24). Hereinafter, a specific example of the information which is output in S24 will be described.

Figure 21:
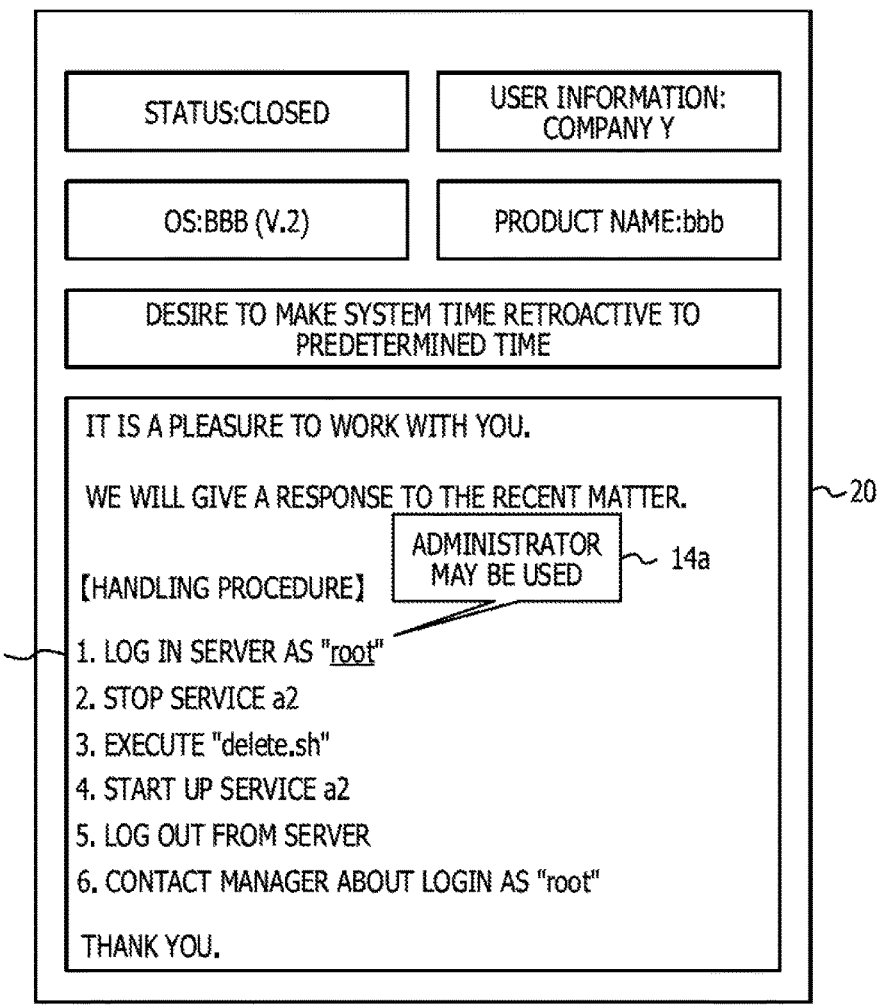
FIG. 21 is a diagram illustrating a specific example of presentation information.

FIG. 21 is a diagram illustrating a specific example of presentation information 136. In the example illustrated in FIG. 21, a description will be given of a case where the incident information 20 illustrated in FIG. 2 is retrieved as a result of the retrieval of the incident information 131 which is performed in S22.

As illustrated in FIG. 21, the information output unit 117 displays the incident information 131 (incident information 20 illustrated in FIG. 2) which is retrieved in S22 on, for example, an input-output device (not shown) of the information processing apparatus 1.

The information output unit 117 outputs "root" which is a first term included in the incident information 131 retrieved in S22 in association with "administrator" which is a first term extracted in S23, among terms included in a reply information column 13 of the incident information 131. Specifically, in the example illustrated in FIG. 21, an explanation sentence 14a (the presentation information 136) having contents of "administrator may be used" is output in association with "root" (underlined portion).

That is, the information processing apparatus 1 can prompt an operator retrieving incident information 131 to retrieve incident information including "administrator" instead of "root" included in the incident information 131 which is output in FIG. 21. Thereby, the operator can retrieve incident information in which terms having the same contents, but which are dependent on an OS different from an OS corresponding to the retrieved incident information 131, are used. For this reason, the operator can increase the accuracy with which useful incident information 131 can be retrieved when an incident event is generated.

Referring back to FIG. 9, the incident information retrieval unit 112 stands by until receiving a request for the execution of further retrieval of the incident information 131 from the business operator terminal 2 (NO in S25). That is, the incident information retrieval unit 112 stands by until receiving a request for the execution of retrieval including the first term extracted in S23 as a retrieval key from the operator having browsed the presentation information 136 which is output in S24.

Thereafter, in a case where the request for the execution of further retrieval of incident information 131 is received from the business operator terminal 2 (YES in S25), the incident information retrieval unit 112 performs retrieval according to contents of the received request for the execution of retrieval (S26). Specifically, in this case, the incident information retrieval unit 112 retrieves incident information including the second term included in the incident information 131 retrieved in S22 and the first term extracted in S23 in incident information 131 stored in the information storage area 130. That is, in the example illustrated in FIG. 21, the incident information retrieval unit 112 retrieves incident information 131 in which "administrator" is used instead of "root" in the incident information 131 which is output. Thereby, the operator does not have to request the execution of new retrieval in the business operator terminal 2 when incident information 131 corresponding to the presentation information 136 which is output in S24 is retrieved.

The information output unit 117 outputs a result of the retrieval of the incident information 131 which is performed in S25 (S27).

Meanwhile, in a case where the information output unit 117 determines that the incident information 131 retrieved in S22 includes a misspelling, the information output unit may output information to that effect. Hereinafter, a description will be given of presentation information 136 in a case where it is determined that the retrieved incident information 131 includes a misspelling.

Figure 22:
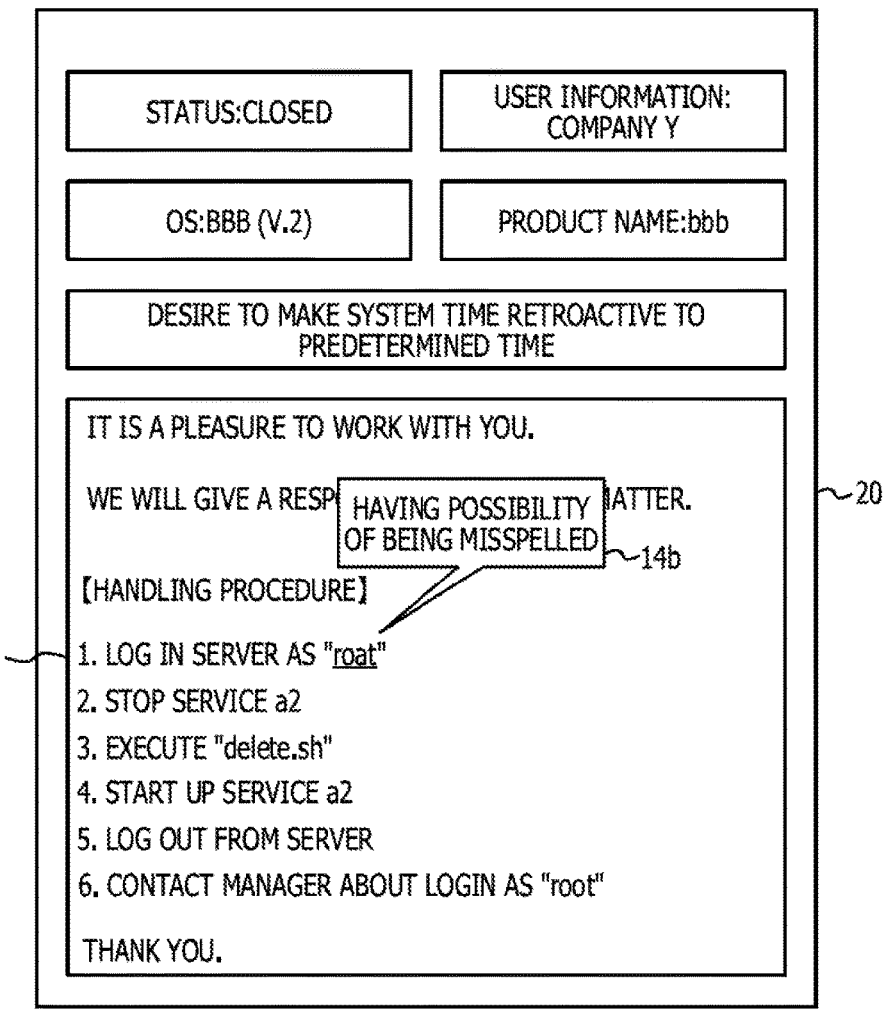
FIG. 22 is a diagram illustrating a specific example of presentation information in a case where incident information retrieved in S22 includes a misspelling.

FIG. 22 is a diagram illustrating a specific example of presentation information 136 in a case where the incident information 131 retrieved in S22 includes a misspelling. The presentation information creation unit 116 refers to information which is set in the "specification result" included in the term specification information 133 described in FIG. 14, for example, in the process of S23. Subsequently, the presentation information creation unit 116 determines whether or not the incident information 131 retrieved in S22 includes a term in which a "misspelling" is set in the "specification result" of the term specification information 133. In a case where the incident information includes a term in which a "misspelling" is set, the information output unit 117 outputs information indicating that the retrieved incident information 131 includes a misspelling as illustrated in FIG. 22.

Specifically, in the example illustrated in FIG. 22, an explanation sentence 14b (the presentation information 136) having contents of "having possibility of being misspelled" is output in association with "root" (underlined portion). Thereby, the operator can recognize that the retrieved incident information 131 includes a misspelling.

In this manner, according to the first embodiment, the information processing apparatus 1 acquires the frequency information 132 including frequencies of the occurrence of terms included in each piece of the incident information 131 for each of a plurality of categories, based on a plurality of pieces of the incident information 131 corresponding to respective incident events. The information processing apparatus 1 creates the correspondence information 134 in which a first term and a second term, which is included in the incident information 131 corresponding to the same incident event as that of the first term among second terms, are associated with each other for each of a plurality of categories and each first term, based on the acquired frequency information 132. Furthermore, the information processing apparatus 1 creates the identical use information 135 in which first terms corresponding to the respective plurality of categories are associated with each other, based on the created correspondence information 134.

Thereby, the information processing apparatus 1 can allow an operator to retrieve useful incident information with a high level of accuracy in order to solve a newly generated incident event.

Meanwhile, in the first embodiment, a case where only two categories are present has been described. On the other hand, in a case where three or more categories are present, the information processing apparatus 1 may perform a retrieval support process for each combination of two categories among the three or more categories. That is, in a case where three types of OSs of "AAA (V.6)", "BBB (V.2)", and "CCC (V.4)" are present, the information processing apparatus 1 may perform a retrieval support process on a combination of "AAA (V.6)" and "BBB (V.2)", a combination of "AAA (V.6)" and "CCC (V.4)", and a combination of "BBB (V.2)" and "CCC (V.4)".

In addition, the information processing apparatus 1 may perform a retrieval support process as another category, for example, for each type of OS and each version. That is, incident information 131 regarding "BBB (V.2)" and "BBB (V.3)" which are different versions of the same OS may be stored in the information storage area 130. In this case, the information processing apparatus 1 may perform a retrieval support process using "BBB (V.2)" and "BBB (V.3)" as other categories.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing a retrieval support program that causes a computer to execute a process comprising:
   acquiring, for each of a plurality of categories relating to computer systems, frequency information including a frequency of occurrence of each of a plurality of terms included in pieces of text information on the computer systems, each of the pieces of text information belonging to one of the plurality of categories;
   specifying, among each of the plurality of terms, a plurality of first terms and a plurality of second terms included in at least one of the pieces of text information based on the frequency information, the plurality of first terms being terms which are not used in common to the plurality of categories, the plurality of second terms being a terms which are used in common to the plurality of categories;
   generating correspondence information for each of the plurality of first terms, the correspondence information associating, for each selected first term of the plurality of first terms, the selected first term with at least one of the plurality of second terms which is included in a piece of text information including the selected first term; and
   generating specified information to identify each combination of first terms, belonging to a different category among the plurality of categories, that have correlativity in at least one of the associated plurality of second terms based on the generated correspondence information,
   wherein the frequency information is information indicating a percentage of pieces of text information including the respective terms among pieces of text information corresponding to the respective categories,
   wherein each of the plurality of first terms is a term in which a difference between a maximum value and a minimum value of the pieces of frequency information is equal to or greater than a first threshold value, among the terms included in the pieces of text information stored in a storage, and wherein each of the plurality of second terms is a term in which a difference between a maximum value and a minimum value of the pieces of frequency, information is less than the first threshold value.

2. The non-transitory computer-readable recording medium according to claim 1,
   wherein each of the plurality of second terms is a term whose frequency of occurrence is equal to or greater than a second threshold value.

3. The non-transitory computer-readable recording medium according to claim 1,
   wherein the correlativity in at least one of the associated plurality of second terms is detected when a percentage of the second terms which are associated in common with the first terms is equal to or greater than a third threshold value.

4. The non-transitory computer-readable recording medium according to claim 1,
   wherein in a case where the text information is retrieved, a first term included in association with a first term included in the retrieved text information is further extracted from the specified information, and the extracted first term is output.

5. The non-transitory computer-readable recording medium according to claim 4,
   wherein the outputting of the first term includes re-retrieving text information including at least one of the plurality of second terms included in the retrieved text information among the pieces of text information stored in the storage and the extracted first term, and the re-retrieved text information is output.

6. A retrieval support device comprising:
   a memory; and
   a processor configured to:
      acquire, for each of a plurality of categories relating to computer systems, frequency information including a frequency of occurrence of each of a plurality of terms included in pieces of text information on the computer systems, each of the pieces of text information belonging to one of the plurality of categories;
      specify, among each of the plurality of terms, a plurality of first terms and a plurality of second terms included in at least one of the pieces of text information based on the frequency information, the plurality of first terms being terms which are not used in common to the plurality of categories, the plurality of second terms being terms which are used in common to the plurality of categories;
      generate correspondence information for each of the plurality of first terms, the correspondence information associating, for each selected first term of the plurality of first terms, the selected first term with at least one of the plurality of second terms which is included in a piece of text information including the selected first term; and generate specified information to identify each combination of first terms, belonging to a different category among the plurality of categories, that have correlativity in at least one of the associated plurality of second terms based on the generated correspondence information, wherein the frequency information is information indicating a percentage of pieces of text information including the respective terms among pieces of text information corresponding to the respective categories, wherein each of the plurality of first terms is a term in which a difference between a maximum value and a minimum value of the pieces of frequency information is equal to or greater than a first threshold value, among the terms included in the pieces of text information stored in a storage, and wherein each of the plurality of second terms is a term in which a difference between a maximum value and a minimum value of the pieces of frequency information is less than the first threshold value.

7. A retrieval support method comprising:

acquiring, for each of a plurality of categories relating to computer systems, frequency information including a frequency of occurrence of each of a plurality of terms included in pieces of text information on the computer systems, each of the pieces of text information belonging to one of the plurality of categories;

specifying, among each of the plurality of terms, a plurality of first terms and a plurality of second terms included in at least one of the pieces of text information based on the frequency information, the plurality of first terms being terms which are not used in common to the plurality of categories, the plurality of second terms being terms which are used in common to the plurality of categories;

generating correspondence information for each of the plurality of first terms, the correspondence information associating, for each selected first term of the plurality of first terms, the selected first term with at least one of the plurality of second terms which is included in a piece of text information including the selected first term; and generating specified information to identify each combination of first terms, belonging to a different category among the plurality of categories, that have correlativity in at least one of the associated plurality of second terms based on the generated correspondence information, wherein the frequency information is information indicating a percentage of pieces of text information including the respective terms among pieces of text information corresponding to the respective categories, wherein each of the plurality of first terms is a term in which a difference between a maximum value and a minimum value of the pieces of frequency information is equal to or greater than a first threshold value, among the terms included in the pieces of text information stored in a storage, and wherein each of the plurality of second terms is a term in which a difference between a maximum value and a minimum value of the pieces of frequency information is less than the first threshold value.

8. The retrieval support device according to claim 6, wherein each of the plurality of second terms is a term whose frequency of occurrence is equal to or greater than a second threshold value.

9. The retrieval support device according to claim 6, wherein the correlativity in at least one of the associated plurality of second terms is detected when a percentage of the second terms which are associated in common with the first terms is equal to or greater than a third threshold value.

10. The retrieval support device according to claim 6, wherein in a case where the text information is retrieved, a first term included in association with a first term included in the retrieved text information is further extracted from the specified information, and the extracted first term is output.

11. The retrieval support device according to claim 10, wherein the outputting of the first term includes re-retrieving text information including at least one of the plurality of second terms included in the retrieved text information among the pieces of text information stored in the storage and the extracted first term, and the re-retrieved text information is output.

12. The retrieval support method according to claim 7, wherein each of the plurality of second terms is a term whose frequency of occurrence is equal to or greater than a second threshold value.

13. The retrieval support method according to claim 7, wherein the correlativity in at least one of the associated plurality of second terms is detected when a percentage of the second terms which are associated in common with the first terms is equal to or greater than a third threshold value.

14. The retrieval support method according to claim 7, wherein in a case where the text information is retrieved, a first term included in association with a first term included in the retrieved text information is further extracted from the specified information, and the extracted first term is output.

15. The retrieval support method according to claim 14, wherein the outputting of the first term includes re-retrieving text information including at least one of the plurality of second terms included in the retrieved text information among the pieces of text information stored in the storage and the extracted first term, and the re-retrieved text information is output.

\* \* \* \* \*